United States Patent [19]

Kobayashi et al.

[11] Patent Number: 5,838,827
[45] Date of Patent: Nov. 17, 1998

[54] APPARATUS AND METHOD FOR SEARCHING MOTION VECTOR

[75] Inventors: Takayuki Kobayashi; David Wuertele; Yutaka Okada, all of Tokyo, Japan

[73] Assignee: Graphics Communication Laboratories, Tokyo, Japan

[21] Appl. No.: 549,530

[22] Filed: Oct. 27, 1995

[30] Foreign Application Priority Data

Nov. 10, 1994 [JP] Japan .................................. 6-276704

[51] Int. Cl.$^6$ .............................. G06K 9/36; G06K 9/46
[52] U.S. Cl. ............................................ 382/236; 348/416
[58] Field of Search ................................. 382/236, 107; 395/806; 348/415, 699, 154, 155

[56] References Cited

U.S. PATENT DOCUMENTS

| | | | |
|---|---|---|---|
| 4,897,720 | 1/1990 | Wu et al. | 358/136 |
| 5,089,887 | 2/1992 | Robert et al. | 358/105 |
| 5,099,325 | 3/1992 | Artieri et al. | 358/136 |
| 5,357,287 | 10/1994 | Koo et al. | 348/699 |
| 5,448,310 | 9/1995 | Kopet et al. | 348/699 |
| 5,453,799 | 9/1995 | Yang et al. | 348/699 |
| 5,563,813 | 10/1996 | Chen et al. | 364/715.01 |
| 5,568,203 | 10/1996 | Lee | 358/133 |
| 5,576,767 | 11/1996 | Lee et al. | 348/413 |
| 5,586,202 | 12/1996 | Ohki et al. | 382/107 |
| 5,590,291 | 12/1996 | Murakami et al. | 395/566 |
| 5,594,813 | 1/1997 | Fandrianto et al. | 382/236 |
| 5,611,038 | 3/1997 | Shaw et al. | 395/806 |

OTHER PUBLICATIONS

"Zero Waiting–Cycle Hierarchial Block Matching Algorithm an its Array Architectures", Wang et al., IEEE Transactions on Circuits and Systems for Video Technology, vol. 4, No. 1, 1 Feb. 1994, pp. 18–27.

"A Versatile and Powerfull Chip for Real Time Motion Estimation", Artieri et al., Spectral Estimation, VLSI, Underwater Signal Processing, Glasgow, May 23–26, 1989, vol. 4, 23 May 1989.

"A Family of VLSI Designs for the Motion Compensation Block–Matching Algorithm", Kun–Min Yang et al., IEEE Transactions on Circuits and Systems, 1,16,31, vol. 36, No. 10, 1 Oct. 1989, pp. 1317–1325.

"Parallel Architectures for 3–Step Hierarchial Search Block–Matching Algorithm", Her–Ming Jong et al., IEEE Transactions on Circuits and Systems for Video Technology, vol. 4, 1 Aug. 1994, pp. 407–415.

"Motion Estimation in the HERMES Videocode", Hildenbrand K et al., Frequenz, vol. 47, No. 11/12, 1 Nov. 1993, pp. 303–309.

Primary Examiner—Joseph Mancuso
Assistant Examiner—Jayanti K. Patel
Attorney, Agent, or Firm—Lane, Aitken & McCann

[57] ABSTRACT

Herein disclosed is a motion vector searching apparatus for searching motion vectors indicative of visual motion between a current picture consisting of current picture blocks and a reference picture consisting of search windows each including a set of reference picture blocks by calculating a set of distortion values and detecting the minimum value from the distortion values. The motion vector searching apparatus comprises means for outputting current block data, means for outputting search window data, and data registering means for registering the search window data in a searching region covering first and second pixels. The data registering means has first transmission registers for initially registering part of the search window data corresponding to the first pixels and second transmission registers for initially registering the remaining part of the search window data corresponding to the second pixels. The motion vector searching apparatus further comprises transmission controlling means for having the search window data transmitted in a predetermined direction from the second transmission registers to the first transmission registers while the search window data is transmitted in the predetermined direction, distortion computing means for computing the distortion values based on the pixel values of one of the current blocks and the pixel values of the search window data registered in order at the first transmission registers, and minimum distortion detecting means for detecting the minimum value from the distortion values computed by the distortion computing means.

34 Claims, 32 Drawing Sheets

a0,0 → (grid)
|b0,0|b1,0|b2,0|b3,0|b4,0|b5,0| ← S0:b5,0
|b0,1|b1,1|b2,1|b3,1|b4,1| |
|b0,2|b1,2|b2,2|b3,2|b4,2|b5,2| ← S1:b5,2
|b0,3|b1,3|b2,3|b3,3|b4,3| |
|b0,4|b1,4|b2,4|b3,4|b4,4|b5,4| ← S2:b5,4
|b0,5|b1,5|b2,5|b3,5|b4,5| |

|b2,2−a0,0| ←

|b2,2−a0,0|
+|b2,3−a0,1| ←

|b2,2−a0,0|
+|b2,3−a0,1|
+|b3,3−a1,1| ←

|b2,2−a0,0|
+|b2,3−a0,1|
+|b3,3−a1,1|
+|b3,2−a1,0| ←

(a)

FIG.30
PRIOR ART
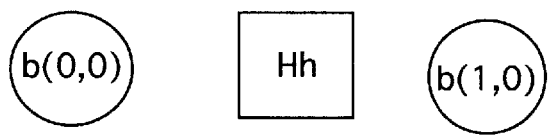
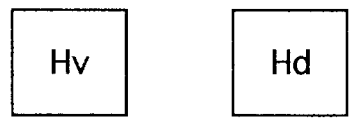

APPARATUS AND METHOD FOR SEARCHING MOTION VECTOR

BACKGROUND OF THE INVENTION

1. Field of the Invention

The present invention relates to a motion vector searching system for searching motion vectors indicative of visual motion between successive digital picture images of a dynamic picture image to compensate the visual motion based on time correlation between the successive digital picture images of the dynamic picture image, more particularly to a motion vector searching system designed to implement a prediction coding for video data compression in accordance with a block matching algorithm.

2. Description of the Prior Art

It has been proposed to implement a prediction coding for video data compression on the base of time correlation between successive digital picture images of a dynamic picture image.

FIG. 23 shows the procedure of a prediction coding known as a basic inter-frame prediction which is utilized for video data compression. In this figure, an object 10 is shown in each of a reference picture frame 11 and a current picture frame 12 to be moved from the left hand boundary of the reference picture frame 11 to the right hand boundary of the current picture frames 12. The current picture frame 12 forms part of successive digital picture frames of a digital dynamic picture image in combination with the reference picture frame 11 which has a frame size identical to that of the current picture frame 12. 15 designates coded data of the current picture 12. The coded data of the current picture 12 includes first difference data 13 for eliminating the image of the object 10 in the reference picture 11, second difference data 14 for producing the image of the object 10 in the current picture 12 and background data 16 representative of the background area of the reference and current picture blocks 11 and 12. The first and second difference data 13 and 14 are obtained by making a predetermined subtractive calculation based on the pixel values of the current and reference picture frames 11 and 12 to form part of coded data of the current picture 12 with the coded background data 16.

FIG. 24 is a conceptional illustration of another prediction coding method so called motion compensation inter-frame prediction, and shows an object 20, a reference picture frame 30, a crenate picture frame 40 and an inter-frame 50. The object 20 is shown to be moved from the left hand boundary of the reference picture frame 30 to the right hand boundary of the current picture frame 40. In this case, the motion of the object 20 indicated by a motion vector "MV" is equivalent to the visual motion between the reference and current picture frames 30 and 40, that is, the motion vector "MV" indicates the visual motion between the reference and current picture frames 30 and 40. The data compression process is implemented by constructing the data of the current picture frame 40 from data for eliminating the image of the object 20 in the reference picture 30, the data representing the motion vector "MV" and the background data 52 representative of the background area of the reference and current picture frames 30. The leading end position of the motion vector "MV" is determined by performing the block matching method which is adopted in the international motion video compression standard ITU-T (International Telecommunication Union-Telecommunication Standardization Sector) H.261.

As shown in FIGS. 25, the reference picture frame 30 includes a search window 31 consisting of a plurality of reference picture blocks partly designated by the numerals 32, while the current picture frame 40 contains a plurality of current picture blocks partly designated by a numeral 42. In this case, the motion vector "MV" is searched as a vector indicating parallel motion of one of reference picture blocks 32, 33 and other reference picture blocks in the reference picture 30 from the position of the reference picture block 32 to the position of a reference picture block 33 shown by dotted lines in the search window 31 of the reference picture 30. FIGS. 26($a$) and 26($b$) show the positional relationship between the current picture block 42, the search window 31 and the reference picture blocks 32 in the search window 31. The current picture block 42 is shown in FIG. 26($b$) to have a horizontal size "M" and a vertical size "N". The search window 31 shown in FIG. 26($a$) has a horizontal size "K" and a vertical size "H" and represented by (x; 0,1,2, ... K−1, y; 0,1,2, ... H−1). In this case, "horizontal size" is the number of the columns of pixels, while "vertical size" is the number of the rows of pixels. The searching region hatched in FIG. 26($a$) is therefore specified as a block having a horizontal size (K−M+1) and a vertical size (H−N+1), and represented by (x; 0,1,2, ... K−M, y; 0,1,2, ... H−N). FIGS. 27($a$) and 27($b$) show a pixel position in one of the reference picture blocks 32 and a pixel position in the current picture block 42 corresponding to the above pixel position in the reference picture block 42. In these figures, "b(k+m; h+n)" indicates the pixel value such as luminance signal value or the like of each pixel in the reference picture block 32, and a(m,n) represents the pixel value of one pixel located in the current picture block 42 with the position same as that of the above pixel having the pixel value b(k+m; h+n) in the reference picture block having the horizontal size "M" and the vertical size "N". The position of the reference picture block 32 is indicated by b(k,h). The leading end position of the motion vector "MV" is defined by one of pixel positions of the reference picture block 33, e.g., a pixel position (0,0) in the block 33 or the center position of the block 33. Thus, the reference picture block 33 is selected out from the reference picture blocks 32 in the search window 31 to be most similar to the current picture block 42 of the current picture 40.

To select the reference picture block 33 most similar to the current picture block 42, it is necessary to calculate a set of values each indicative of the similarity between one of the current picture blocks and each of the reference picture blocks in the search window 31. The values are calculated as a set of difference values between one of the current picture blocks and a set of reference picture blocks in the search window 31, and the minimum value is detected from the calculated values to specify the reference picture block most similar to the current picture block 42. Each of the calculated values is so-called "distortion" and representative of the difference between one of the current picture blocks and one of the reference picture blocks in each of the search windows. The minimum value is so-called "minimum distortion" and indicative of a pair of best matching picture blocks consisting of one of the current picture blocks and one of the reference picture blocks. The position of the reference picture block corresponding to the minimum distortion value specifies the leading end position of the motion vector "MV" in each of the search windows to be representative of the position of one of the current picture blocks in the region 41 shown by doted lines and having a size identical to that of the search window 31 in the current picture 40. Each of the distortion values is calculated by a distortion D(k,h) function of the form:

$$D(k, h) = \sum_{m=0}^{M-1} \sum_{m=0}^{M-1} \|b(m+k, n+h) - \quad (1)$$

$$a(m, n)\| = \sum_{m=0}^{M-1} \sum_{m=0}^{M-1} \|d(k, h)\|$$

where

"a" and "b" respectively indicate pixel values;

(m+k, n+h) denotes a pixel position in each of search windows;

(m,n) is a pixel position in each of current picture blocks;

d(k, h) denotes a local distortion value equivalent to the difference value between the pixel values a(m,n) and b(m+k, n+h);

∥————∥ represents a function known as a norm for defining scale measure of motion vectors; and $$\sum_{m=0}^{M-1}$$

indicates summation from m=0 M−1.

Generally, it is effective and simple to have sum of absolute values or square values calculated with the norm function.

FIG. 28 shows a prior art motion vector searching apparatus in combination with FIG. 29 wherein a search window "W" includes a plurality of pixels corresponding to K columns of H pixels, and a current picture block TP includes a set of pixels corresponding to M columns of N pixels. In other words, the search window "W" has a horizontal size K and a vertical size H, while the current picture block TP a horizontal size M and a vertical size N. In this case, the number of the reference picture blocks included in the search window "W" is equal to (K−M+1)(H−N+1). In FIG. 28, each of the pixels in the reference picture blocks 32 is sequentially supplied to the motion vector searching apparatus as shown in FIG. 28 by a pair of input pixel values b1(k+m, h+n) and b2(k+m, h+n) to be inputted through input channels S0 and S1. The motion vector searching apparatus shown in FIG. 28 comprises a calculating circuit 60 of a systolyic array structure type, motion vector detecting unit 70 and a timing control unit 80. The calculating circuit 60 has three columns of three processor elements 61A, 61B, 61C, 62A, 62B, 62C, 63A, 63B and 63C, two rows of side registers 71, 72, 73, 74, 75 and 76, and a column of input register units 81, 82, 83, 84 and 85. The processor elements 61A to 63A, 61B to 63B, or 61C to 63C are distributed in a line and operated to be associated with one another. Each of the pixel values of the current block data TP is provided to the processor elements 61A to 63C in parallel via a data input channel to have the pixel values of each of the current picture blocks TP sequentially inputted thereto. The pixel values of the search window W 200 inputted to the calculating circuit 60 are respectively shifted to adjacent register units and the processor elements to be transmitted through a predetermined three transmission paths. The processor elements 61A and 62C, the side register units 71 to 76 and the input register 81 to 85 are vertically connected to have the pixel values of each of the reference picture blocks 32 inputted to the processor elements 61A to 63A, 61B to 63b, or 61C to 63C. The three groups of processor elements 61A to 63A, 61B to 63b, and 61C to 63C are respectively connected to have the inputted pixel values transmitted in the horizontal direction and to transmit the distortion values calculated by each group of the processor elements 61A to 63A, 61B to 63b, and 61C to 63C in the horizontal direction in the calculating circuit 60. The local distortion values calculated by the processor elements 61A to 63A, 61B to 63B, or 61C to 63C are totaled while they are calculated and transmitted in the horizontal direction. The motion vector detecting unit 70 is operated to detect the minimum distortion value selected from a set of distortion values, corresponding to the reference picture blocks 32 in the search window 31. Each of the distortion values is calculated by totaling the local distortion values calculated by the processor elements 61A to 63C based on the pixel values of each of the reference picture blocks 32 and each of the current picture blocks 42. In FIG. 28, "MV" indicates data of the motion vector and "MinDis" represents the minimum distortion value.

Another motion vector searching system for implementing another motion video compression method, as shown in FIG. 30, which is adopted in ISO/IEC 11172-2 and ISO/IEC 13818-2, hereinlater disclosed by "MPEG (Moving Picture Experts Group)", for rectifying the accuracy of the prediction coding. According to the method, a plurality of separate distortion arrays for three half pel phases Hh (horizontally interpolated phase), Hv (vertically interpolated phase) and Hd (diagonally interpolated phase) are created to search a plurality of additional motion vectors on the basis of the distortion array for the integer pel phase including a plurality of pixel values "b0,0", "b0,1", "b1,0" and "b1,1". Each of the distortion values in the half pel phases Hh, Hv and Hd is calculated in accordance with each of the formulas of the form:

$$Hh=\{b(0,0)+b(1,0)\}/2 \quad (2)$$

$$Hv=\{b(0,0)+b(0,1)\}/2 \quad (3)$$

$$Hd=\{b(0,0)+b(1,0)+b(0,1)+b(1,1)\}2 \quad (4)$$

The additional motion vectors are searched based on the separate distortion arrays for the integer pel phase and the three half pel phases Hh, Hv and Hd, thereby rectifying the accuracy of the prediction coding.

In each of the above motion vector searching systems, the data of the current picture blocks is coded by constructing the coded data from the preliminarily encoded data with the data of the motion vectors and the minimum distortion values in accordance with the above motion compensation inter-frame prediction, thereby reducing the amount of data of the current picture and other successive digital picture images of the digital dynamic picture image in comparison with the above basic inter-frame prediction coding.

However, in the advantageous motion vector searching systems, the processor elements in the searching region (x; 0, 1, 2, ... K−M, y; 0, 1, 2, ... H−N) are operated to perform the above distortion calculation (K−M)(H−N) times to implement so-called full search block matching where the distortion values corresponding to all of the reference picture blocks are calculated. The number of the pixel values each latched in the processor element in the searching region is therefore equal to the number of the processor elements. ( See a motion vector searching system disclosed in Japanese Patent Laid-open Publication No. 2-283170.) This leads large scale and costly calculating circuit of the motion vector searching system, especially in case of the calculating circuit of systolic array type, as well as the tremendous complexity in the calculating circuit of the motion vector searching apparatus. Further, it is difficult for the above prior art motion vector searching systems to implement rough block matching wherein the number of the reference picture blocks in each of the search windows is less than the number of the reference picture blocks in each of the search windows in the full search block matching procedure. For that reason, the calculating circuit is necessary to be large in the circuit scale to form a large scale searching region in case that each of the search windows has a large scale determined in compliance with a quick visual motion between the reference and current pictures. Time sharing of the processor elements is impossible for the motion vector searching system by the reason that a very severe speed for calculating and adding the local distortion values many times is required, although the time sharing of the processor elements may be effective for quickly calculating distortions in parallel.

The present invention contemplates provision of an improved motion vector searching apparatus overcoming the aforementioned drawbacks of the prior-art motion vector searching systems.

SUMMARY OF THE INVENTION

It is therefore an object of the present invention to provide a motion vector searching apparatus for implementing dispersed search block matching wherein the number of the reference picture blocks in each of the search windows is less than the number of the reference picture blocks in each of the search windows in the full search block matching procedure.

It is another object of the present invention to realize a motion vector searching method of implementing the above dispersed search block matching.

According to one aspect of the present invention there is provided a motion vector searching apparatus for searching a plurality of motion vectors indicative of visual motion between a current picture and a reference picture forming part of successive pictures for displaying a dynamic picture image, the current picture consisting of a plurality of current picture blocks each having a plurality of pixels distributed in rows and columns, the reference picture consisting of a plurality of search windows each including a set of reference picture blocks each having a block size the same as that of each of the current picture blocks, each of the motion vectors being searched by calculating a set of distortion values and detecting the minimum value from the distortion values, each of the distortion values being indicative of the difference between each of the reference picture blocks and each of the current picture blocks, comprising: current block data outputting means for outputting current block data representative of the current picture blocks and including a plurality of pixel values of the pixels of the current picture blocks; search window data outputting means for outputting search window data representative of the search windows and including a plurality of pixel values of the pixels of the search windows to have each of the search windows include two or more reference picture blocks; data registering means for registering the search window data in a searching region with a block size larger than that of each of the reference picture blocks, the searching region covering a plurality of first pixels and a plurality of second pixels each intervening between the first pixels, the data registering means having a plurality of first transmission registers for initially registering part of the search window data corresponding to the first pixels and a plurality of second transmission registers for initially registering the remaining part of the search window data corresponding to the second pixels; transmission controlling means for controlling the first and second transmission registers to have the search window data transmitted in a predetermined direction in the searching region, the pixel values of the search window data being transmitted from the second transmission registers to the first transmission registers in the searching region while the search window data is transmitted in the predetermined direction in the searching region; distortion computing means for computing the distortion values on the basis of the pixel values of one of the current picture blocks represented by the current block data and the pixel values of the search window data registered in order at the first transmission registers; and minimum distortion detecting means for detecting the minimum value from the distortion values computed by the distortion computing means.

The motion vector searching apparatus may comprise a set of calculators each forming part of the distortion computing means and associated with one another to calculate a set of local distortion values based on the pixel values of the current picture blocks from the current block data outputting means and the pixel values registered in the first transmission registers of the data registering means. In this case, the pixel values of the remaining part of the search window data are registered at the second transmission registers while the calculators are operated to calculate the local distortion values based on the pixel values of the current picture blocks from the current block data outputting means and the pixel values of the part of the search window data registered in the first transmission registers of the data registering means.

According to another aspect of the present invention there is provided a motion vector searching apparatus for searching a plurality of motion vectors indicative of visual motion between a current picture and a reference picture forming part of successive pictures for displaying a dynamic picture image, the current picture consisting of a plurality of current picture blocks each having a plurality of pixels distributed in N rows and M columns, each of the N and M being an integer, the reference picture consisting of a plurality of search windows each including a set of reference picture blocks each having a block size the same as that of each of the current picture blocks, each of the motion vectors being searched by calculating a set of distortion values and detecting the minimum value from the distortion values, each of the distortion values being indicative of the difference between each of the reference picture blocks and each of the current picture blocks, comprising: current block data outputting means for outputting current block data representative of the current picture blocks and including a plurality of pixel values of the pixels of the current picture blocks; search window data outputting means for outputting search window data representing the search windows each having a window size of K columns of H pixels and including a plurality of pixel values of the pixels of the search windows to have each of the search windows include two or more reference picture blocks; data registering means for registering the search window data in a searching region with a block size of (H−N+1) rows and (K−M+1) columns larger than the size of each of the reference picture blocks, the searching region covering a plurality of first pixels and a plurality of second pixels each intervening between the first pixels, the data registering means having a plurality of first transmission registers for initially registering part of the search window data corresponding to the first pixels and a plurality of second transmission registers for initially registering the remaining part of the search window data corresponding to the second pixels; transmission controlling means for controlling the first and second transmission registers to have the search window data transmitted in a predetermined direction in the searching region, the pixel values of the search window data being transmitted from the second transmission registers to the first transmission registers in the searching region while the search window data is transmitted in the predetermined direction in the searching region; distortion computing means for computing the distortion values on the basis of the pixel values of one of the current picture blocks represented by the current block data and the pixel values of the search window data registered in order at the first transmission registers; and minimum distortion detecting means for detecting the minimum value from the distortion values computed by the distortion computing means.

According to a further aspect of the present invention there is provided a motion vector searching method of searching a plurality of motion vectors indicative of visual motion between a current picture and a reference picture forming part of successive pictures for displaying a dynamic picture image, the current picture consisting of a plurality of current picture blocks each having a plurality of pixels distributed in rows and columns, the reference picture consisting of a plurality of search windows each including a set of reference picture blocks each having a block size the same as that of each of the current picture blocks, each of the motion vectors being searched by calculating a set of distortion values and detecting the minimum value from the distortion values, each of the distortion values being indicative of the difference between each of the reference picture blocks and each of the current picture blocks, comprising the steps of: preparing a plurality of first and second transmission registers each operative to register a pixel value and collectively form a searching region with a block size larger than that of each of the reference picture blocks, the searching region covering a plurality of first pixels and a plurality of second pixels each intervening between the first pixels; outputting current block data representative of the current picture blocks and including a plurality of pixel values of the pixels of the current picture blocks; outputting search window data representative of the search windows and including a plurality of pixel values of the pixels of the search windows to have each of the search windows include two or more reference picture blocks; sequentially registering the pixel values of the search window data in the searching region with the first and second transmission registers; controlling the first and second transmission registers to have part of the search window data corresponding to the first pixels initially registered at the first transmission registers and the remaining part of the search window data corresponding to the second pixels initially registered at the second transmission registers and to transmit the pixel values of the remaining part of the search window data from the second transmission registers to the first transmission registers in order while the search window data is transmitted in the predetermined direction in the searching region; computing the distortion values on the basis of the pixel values of each of the current picture blocks represented by the current block data and the pixel values of the first pixels represented by the search window data registered in the first transmission registers; and detecting the minimum value from the computed distortion values to select from the reference picture blocks one most similar to one of the current picture blocks.

The motion vector searching method may comprise the steps of: preparing a set of calculators respectively operative to calculate local distortion values on the basis of the pixel values of the outputted current picture blocks and the pixel values registered in the first transmission registers; dividing the search window data into the part of the search window data and the remaining part of the search window data to be transmitted from the second transmission registers to the first transmission registers; sequentially inputting the part of the search window data and the remaining part of the search window data to the first transmission registers; calculating a set of local distortion values by the calculators based on the pixel values of the current picture blocks and the pixel values of the part of the search window data registered in the first transmission registers; and calculating a set of local distortion values by the calculators based on the pixel values of the current picture blocks and the pixel values of the remaining part of the search window data transmitted from the second transmission registers and registered in the first transmission registers.

BRIEF DESCRIPTION OF THE DRAWINGS

The features and advantages of a motion vector searching apparatus in accordance with the present invention will be more clearly understood from the following description taken in conjunction with the accompanying drawings in which:

Figures 17A, 17B, 17C, 17D:
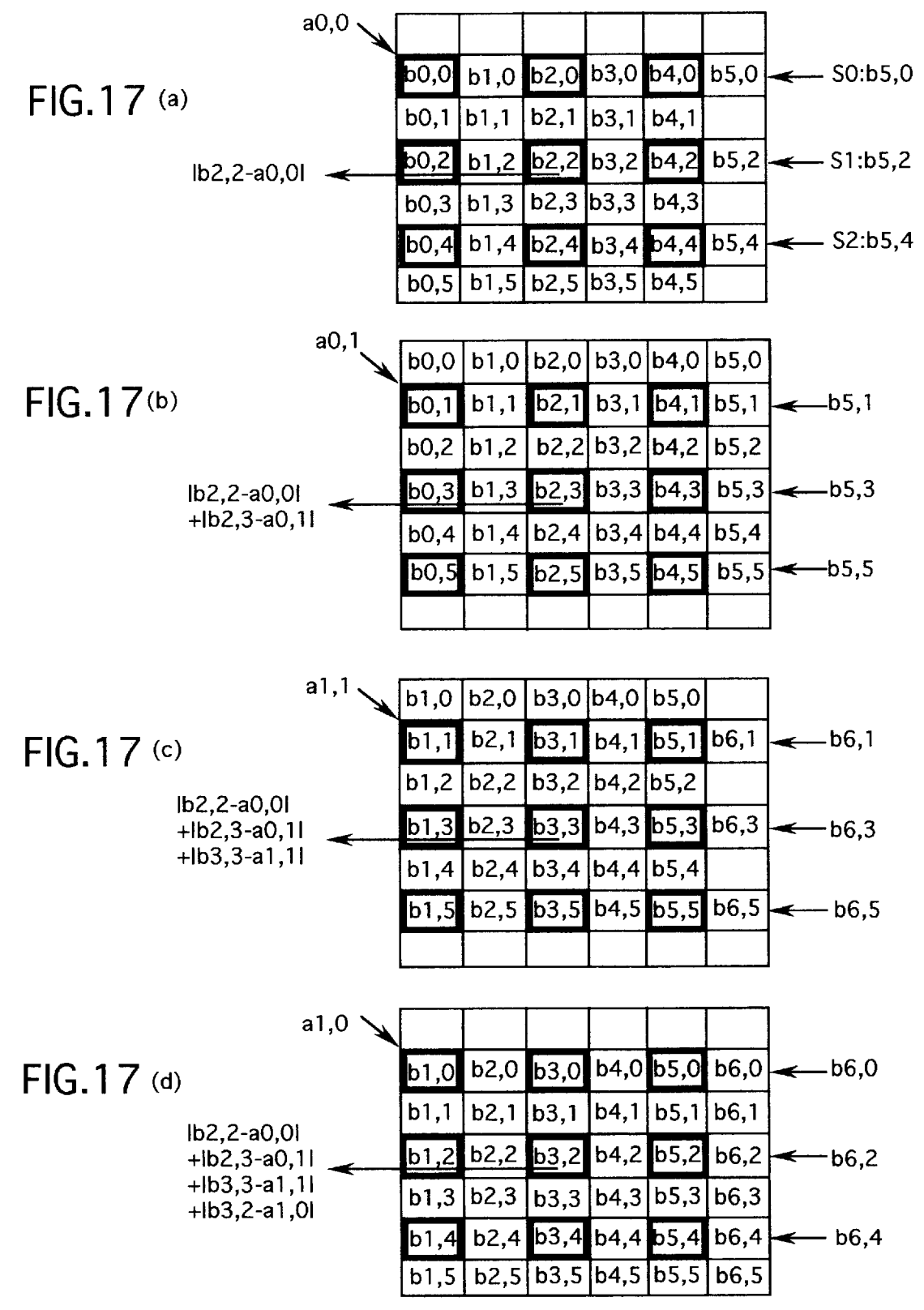

FIGS. 17(a), 17(b), 17(c) and 17(d) show possible calculating steps performed by the calculating circuit of the motion vector searching apparatus;

FIG. 30 is an explanatory view showing part of search window including four integer pels and three half-pels intervening between the integer pels.

DESCRIPTION OF THE PREFERRED EMBODIMENTS

Referring to FIGS. 1 to 19 of the drawings, a first preferable embodiment of a motion vector searching apparatus embodying the present invention is schematically illustrated. The motion vector searching apparatus is roughly designed to search a plurality of motion vectors indicative of visual motion between a current picture and a reference picture respectively forming part of successive picture for displaying a dynamic picture image. The current picture to be predicted consists of a plurality of current picture blocks each having a plurality of pixels which are distributed in rows and columns. The reference picture consists of a plurality of search windows each including a set of reference picture blocks. Each of the reference picture blocks in the search window has a block size same as that of each of the current picture blocks.

Figure 1:
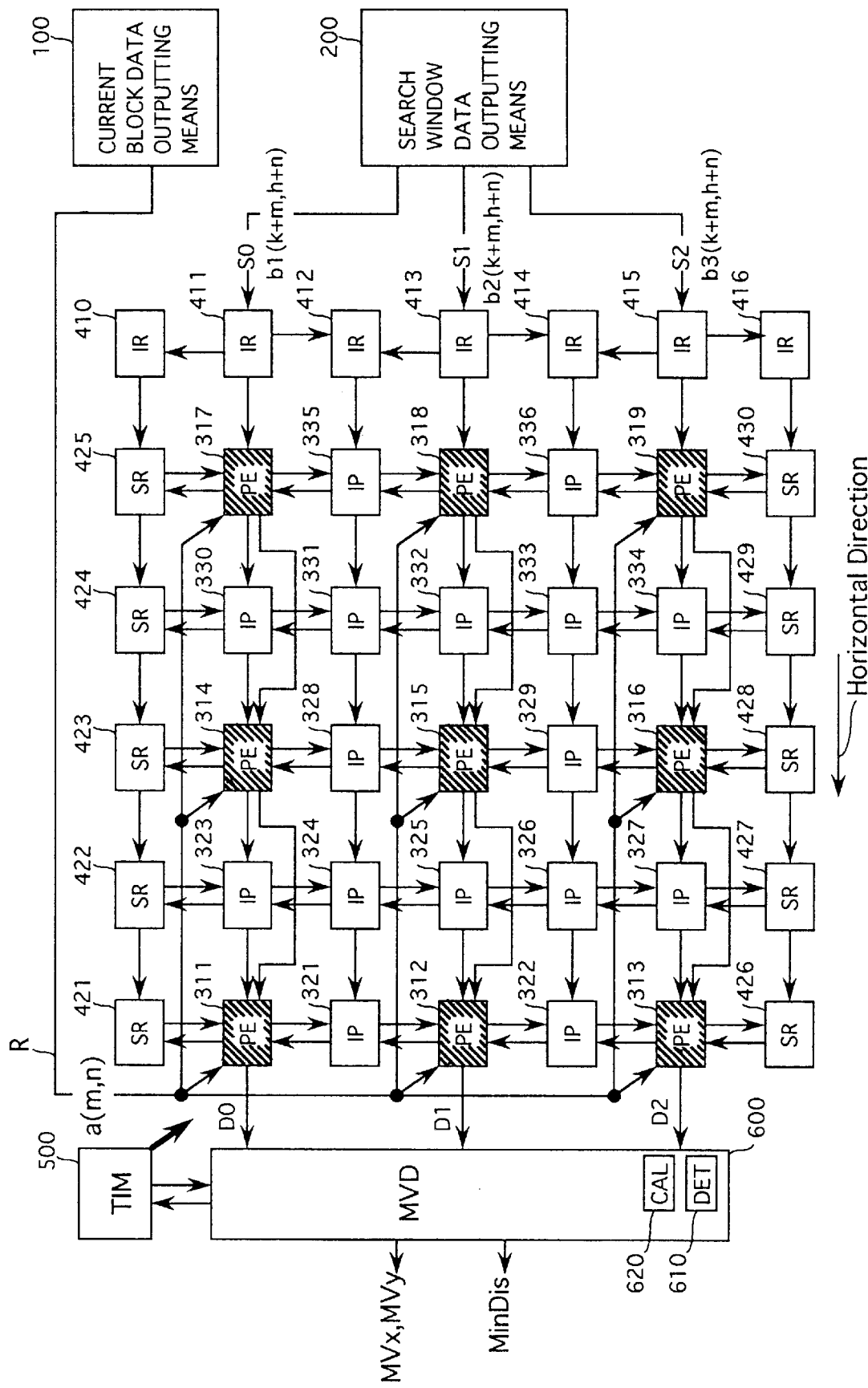
FIG. 1 is a plan view of a first embodiment of the motion vector searching apparatus according to the present invention.
Figure 2:
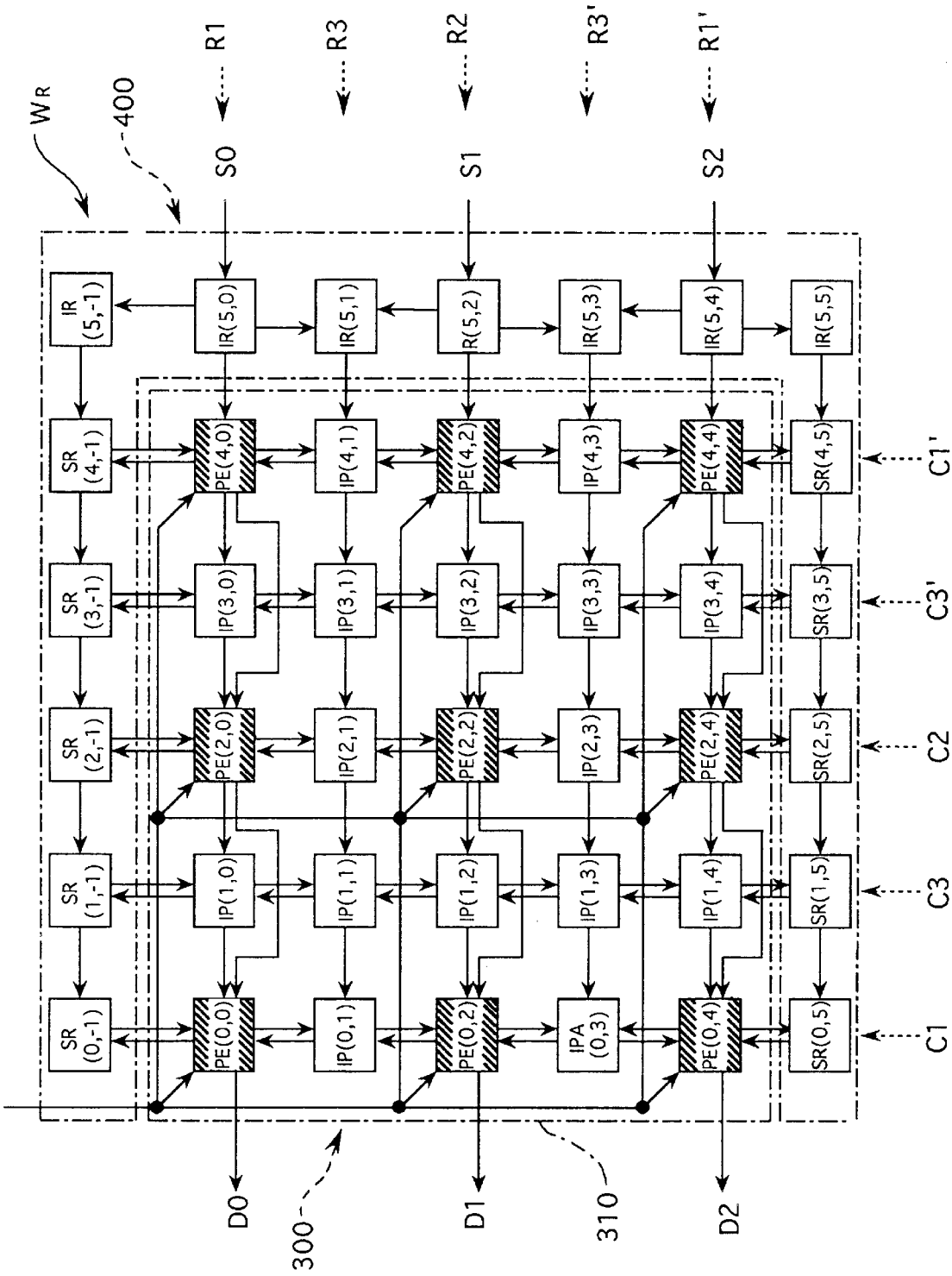
FIG. 2 is a plan view of a calculating circuit forming part of the motion vector searching apparatus shown in FIG. 1.

In FIGS. 1 and 2, the motion vector searching apparatus is shown as comprising a current block data outputting unit 100, a search window data outputting means 200, a calculating circuit 300, a transmission controlling unit 400, a timing control unit 500 and a motion vector detecting unit 600.

Figure 3:
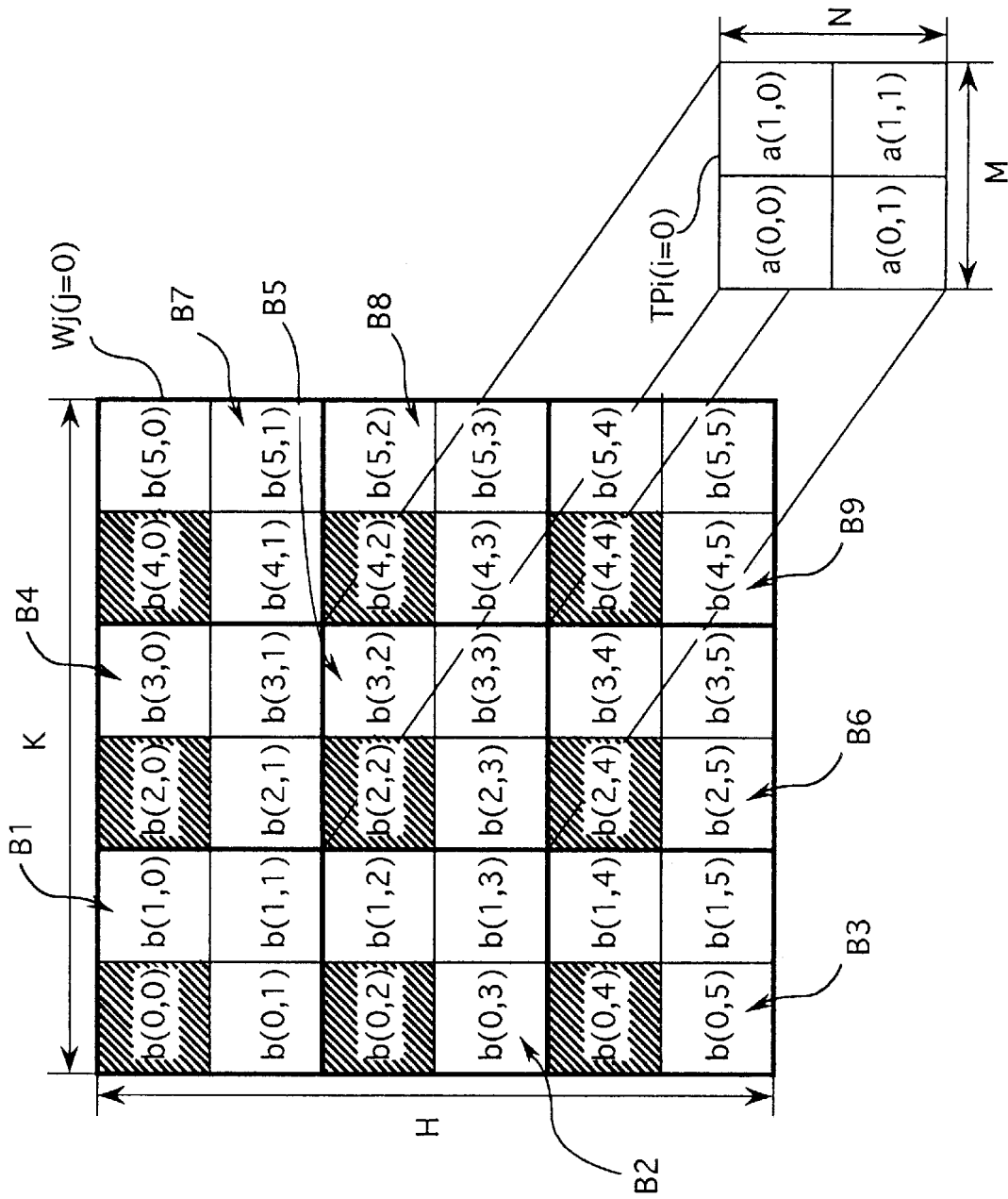
FIG. 3 is an explanatory diagram showing search window data and reference picture block data respectively including a plurality of pixel values.
Figure 4:
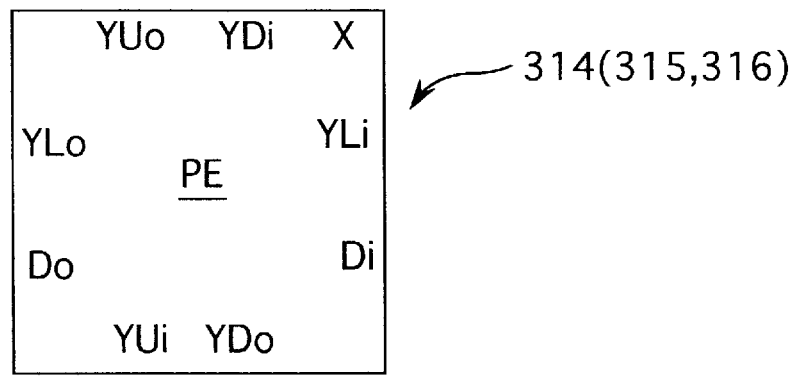
FIGS. 4(a), 4(b) and 4(c) are block diagrams showing three types of processor elements forming part of the calculating circuit shown in FIG. 2.
Figure 4:
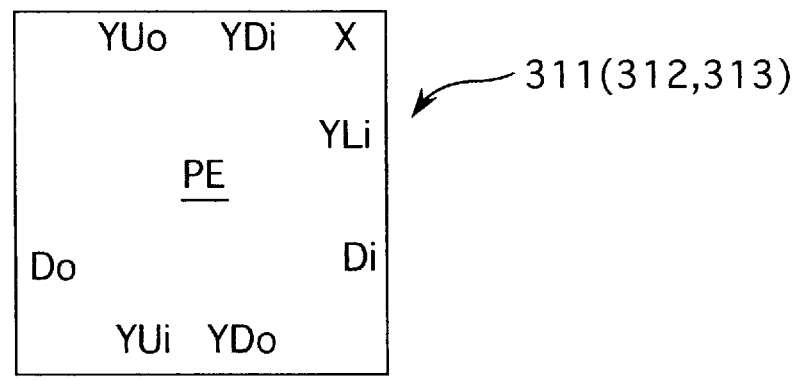
Figure 4:
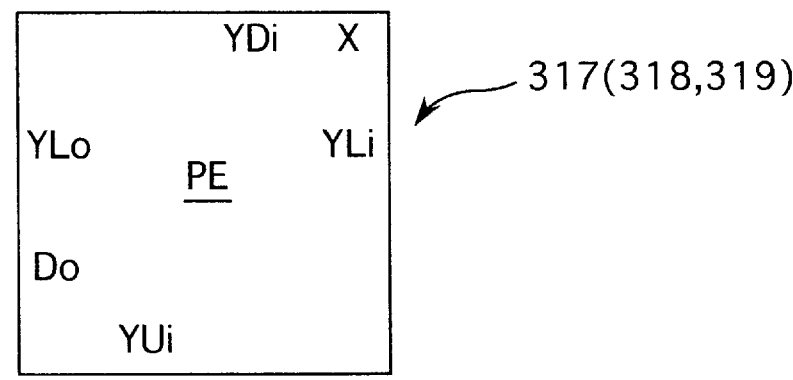

The current block data outputting unit 100 is equipped with an image data memory for storing video data of the current picture, and adapted to output current block data representative of the current picture blocks each including a plurality of pixel values, i.e., luminance signal values "Y" and the like " " of the current picture blocks. Each of the current picture blocks of the current picture has a block size of M columns of N pixels. That is, each of the current picture blocks in the present embodiment has a horizontal size M and a vertical size N. These "M" and "N" are respectively representative of certain integer numbers. The "horizontal size" means the number of the columns of pixels, while the "vertical size" means the number of the rows of pixels. In FIG. 3, one of the current picture blocks TPi (i=0,1,2,3 . . . ) is shown as having a block size of two columns of two pixels wherein a plurality of pixel values a (0,0), a (0,1), a (1,0) and a (1,1) are included. The current block data TPi is provided to the calculating circuit 300, via a data input line such as bus structure, to have the pixel values of each of the current picture blocks TPi sequentially inputted thereto. In this embodiment, each of the current and reference pictures consists of one of successive picture frames of a digital dynamic picture image. The picture may be a picture field forming part of odd and even picture fields of each of the successive picture frames.

The search window data outputting unit 200 has a data memory for storing search window data Wj (j=0,1,2,3 . . . ) representative of each of the search windows of the reference picture and a cache memory, not shown, for memorizing part of the search window data Wj, and is designed to output the search window data Wj from the cache memory. The search window data Wj includes a plurality of pixel values of each of the search windows to have each of the search windows include two or more reference picture blocks. The search window data representative of each of the reference picture blocks is divided into first and second pixel data each forming part of the same reference picture blocks to have the pixel values of different pixels and to be sequentially inputted to the calculating circuit 300. Specifically, each of the search windows has a window size of K columns of H pixels. In other words, each of the search windows has a horizontal size "K" and a vertical size "H" and represented by (x; 0,1,2, . . . K–1, y; 0,1,2, . . . H–1).

Each of "K" and "H" is representative of a certain integer value. For simplicity, a search window shown in FIG. 3 has a window size of six columns of six pixels, wherein nine reference picture blocks b1 to b9 exactly the same as the current picture block TPi in the block size are included. In this case, the pixel values of reference picture blocks b1 to b9 are respectively provided to the calculating circuit 300 through three data input lines S0, S1 and S2. Each of three pixel values simultaneously inputted to the calculating circuit 300, e.g., pixel values b1(k+m, h+n), b2(k+m, h+n) and b3(k+m, h+n) corresponds to each of the same pixel positions (k+m, h+n) in each of the picture blocks.

The calculating circuit 300 is of a systolyic array structure type and so constructed as including three or more columns of processor elements and a plurality of intermediate register units. In FIG. 1, the calculating circuit 300 is simplified to include three columns of processor elements 311, 312, 313, 314, 315, 316, 317, 318 and 319 and a plurality of intermediate register units 321, 322, 323, 324, 325, 326, 327, 328, 329, 330, 331, 332, 333, 334, 335 and 336.

As shown in FIGS. 4(a) to 4(c), each of the processor elements 311 to 319 has a current block data input line X to which each of the pixel values of the current block data TPi is inputted, three search window data input lines YDi, YUi and YLi to which the pixel values of the search window data are inputted, search window data output lines YUo and YDo from which the inputted pixel value of the search window data is outputted, and a distortion output line Do. Each of the processor elements 311 to 319 is adapted to compute a distortion value representative of the difference between one of the current pictures and each of the reference picture blocks. In other words, the calculating circuit 300 includes a set of calculators each forming part of the processor elements 311 to 319 and respectively operative to calculate the distortion values on the basis of the pixel values of the current picture blocks outputted from the current block data outputting means 100 and the pixel values registered at first transmission registers 352 (See FIG. 5) of the processor elements 311 to 319. The computed distortion values are respectively outputted from the distortion output lines Do. Each of the processor elements 311 to 316 further has a distortion input line Di operative to input the distortion value from each of the distortion output lines Do of the adjacent processor elements 314 to 319, while each of the processor elements 314 to 319 further has a search window data output lines YLo operative to output the registered pixel value of the search window data.

Figure 5:
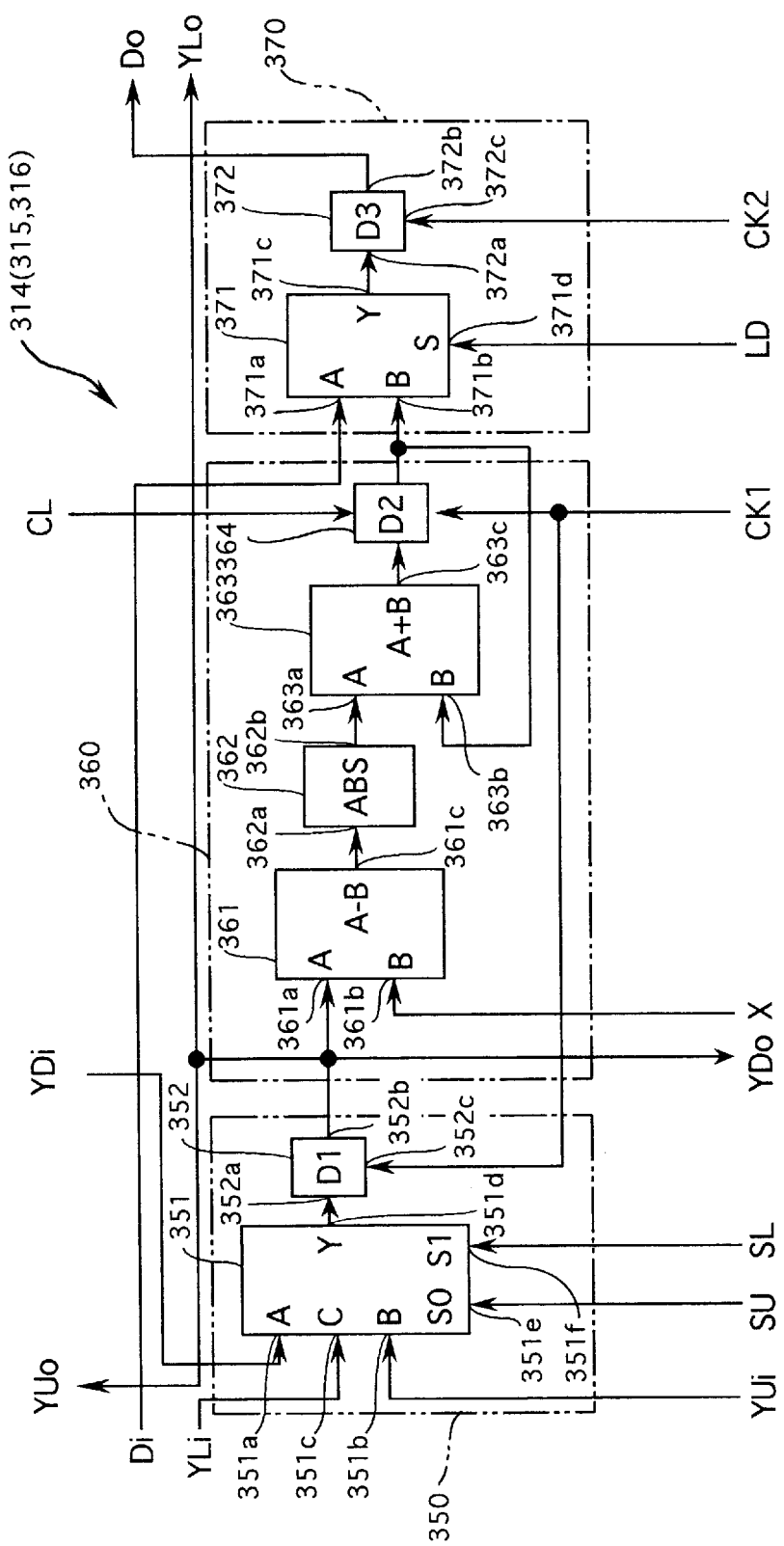
FIG. 5 specifically shows a circuit of the processor element shown in FIG. 4(a)
Figure 6:
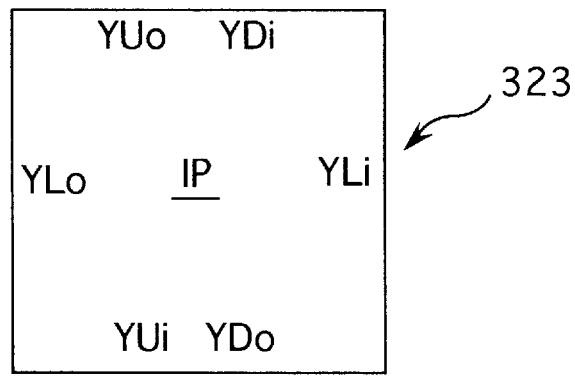
FIGS. 6(a) and 6(b) are block diagrams showing two types of intermediate register units forming part of the calculating circuit shown in FIG. 2.
Figure 6:
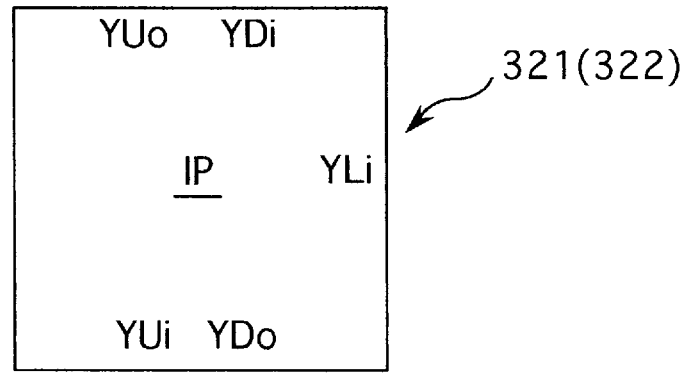

Each of the processor elements 314 to 316 is shown in FIG. 5 as including an input data selecting unit 350, a distortion calculating unit 360 and an output data selecting unit 370.

The input data selecting unit 350 is constituted by a data selector 351 and a data register 352. The data selector 351 has three input ports 351a, 351b and 351c, an output port 351d and a pair of control signal input ports 351e and 351f. The data register 352 has a data input port 352a, a data output port 352b and a clock signal port 352c. The data selector 351 is operated in accordance with the selector control signals "SU" and "SL" to select from three data input lines YDi, YLi and YUi one data input line through which one of the pixel values of the search window data is inputted to the data selector 351. The pixel value inputted to the data selector 351 is outputted from the output port 351d of the data selector 351 to the data input port 352a of the data register 352. The data register 352 consists of a D-flip-flop which is so operated with the clock signal CK1 as to latch and output the data from the data selector 351 in compliance with each of the clock pulses of the clock signal CK1.

The distortion calculating unit 360 has a data subtracting circuit 361, an absolute value circuit 362, a local distortion adder 363 and a distortion register 364. The data subtracting circuit 361 has a first input port 361a to which the data from the data register 352 is inputted, a second input port 361b operative to input the current picture data from the current block data outputting unit 100 through the current block data input line "X", and an output port 361c from which an output value is outputted. The data subtracting circuit 361 is designed to make a difference value "A−B" between the pixel value "A" inputted to the first input port 361a from the data register 352 and the data "B" inputted to the second input port 361b from the current block data outputting unit 100. The absolute value circuit 362 has a data input port 362a and a data output port 362b, and is adapted to make an absolute value based on the difference value from the data subtracting circuit 361. The local distortion adder 363 has an input port 363a, another input port 363b and an output port 363c. This local distortion adder 363 is operated to add the absolute value from the absolute circuit 362 to a value preliminarily outputted from the local distortion adder 363 and latched at the distortion register 364. The distortion register 364 is operated in accordance with the clock signal CK1 and the clear signal CL to have a set of local distortion values totaled and outputted to the output data selecting unit 370. The pulse of the clock signal CL is generated to have the total value of the local distortion values cleared out. This means that four local distortion values are totaled by the local distortion adder 363 and the local distortion register 364 to compute a distortion value between each of the current picture blocks and each of the reference picture blocks until the clear signal CL is inputted to the local distortion register 364.

The output data selecting unit 370 is constituted by a data selector 371 and a data register 372. The data selector 371 has two input ports 371a and 371b, an output port 371c and a control signal input ports 371d. The data register 372 has a data input port 372a, a data output port 372b and a clock signal port 372c. The data selector 371 is operated with the selector control signal "LD" to select from the input data input line Di and the distortion data line connected to the distortion register 364 one input data line through which the added distortion value is inputted to the data selector 371. The pixel value inputted to the data selector 371 is outputted from the output port 371c of the data selector 371 to the data register 372. The data register 372 consists of a D-flip-flop which is operated with the clock signal CK2, having a timeinterval three time as long as the clock pulses of the clock signal CK1, so as to latch and output the data from the data selector 371 in compliance with the clock signal CK2.

As shown in FIGS. 6(a) and 6(b), each of the intermediate register units 321 and 322 has three search window data input lines YDi, YUi and YLi to which the pixel values of the search window data are transmitted, search window data output lines YUo and YDo from which the inputted pixel value of the search window data is outputted in parallel. Each of the intermediate register units 323 to 336 shown in FIG. 6(a) has three search window data input lines YDi, YUi and YLi to which the pixel values of the search window data are transmitted, search window data output lines YUo, YDo and YLo for outputting the pixel value of the search window data in parallel. Each of the intermediate register units 321 to 336 is adapted to register one of the pixel values from the search window data input lines YDi, YUi and YLi.

Figure 7:
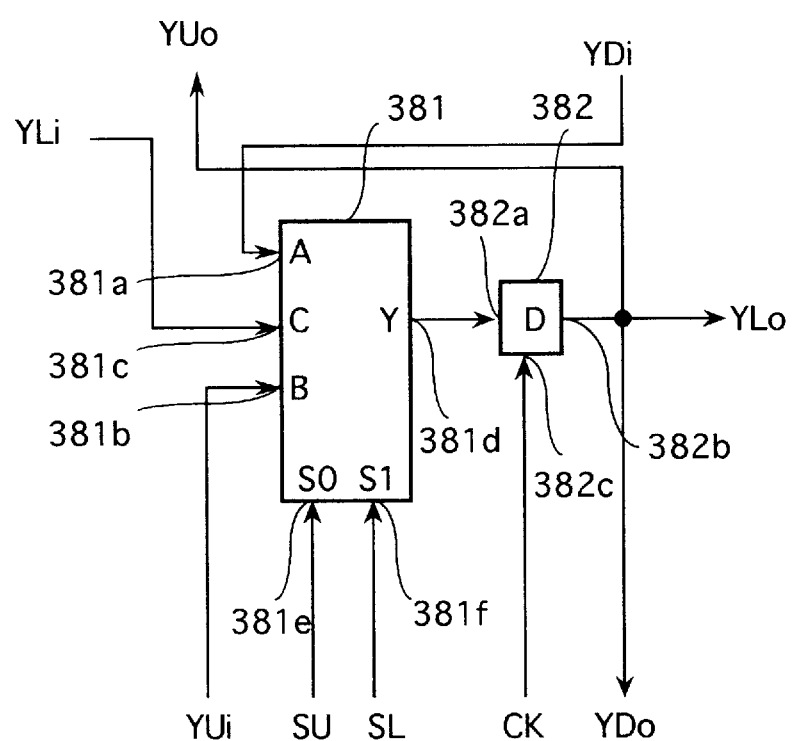
FIG. 7 in detail shows a circuit of the intermediate register unit shown in FIG. 6(a)
Figure 8:
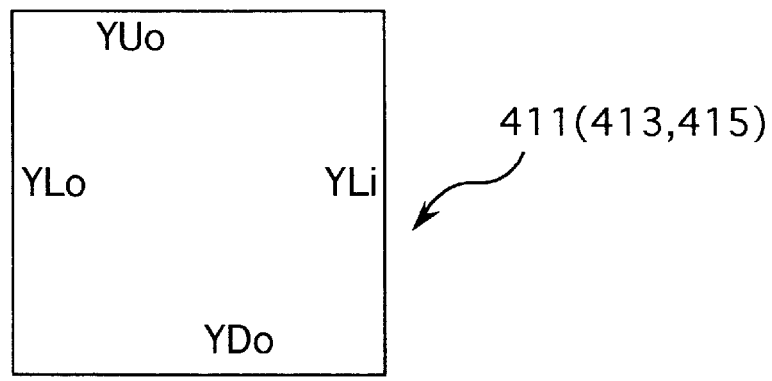
FIGS. 8(a), 8(b), 8(c) and 8(d) are block diagrams showing four types of input register units forming part of the calculating circuit shown in FIG. 2.
Figure 8:
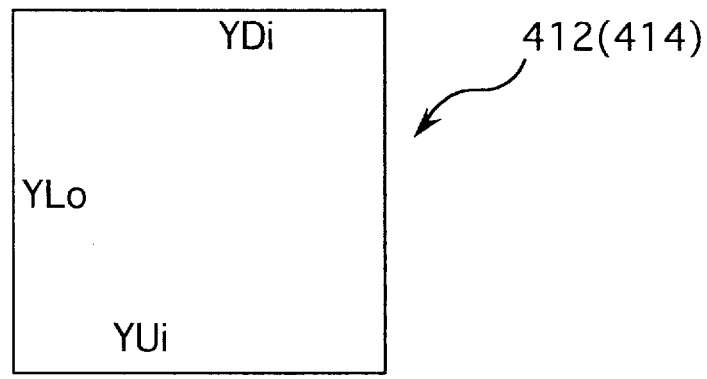
Figure 8:
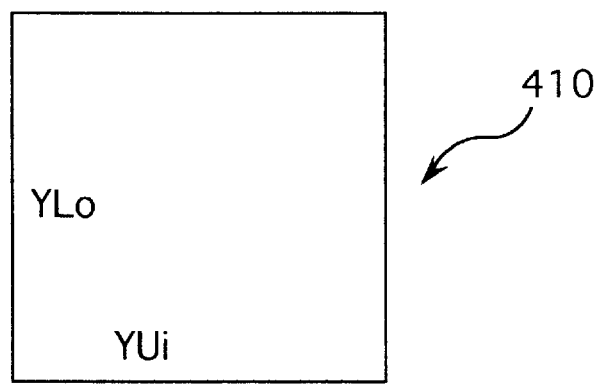
Figure 8:
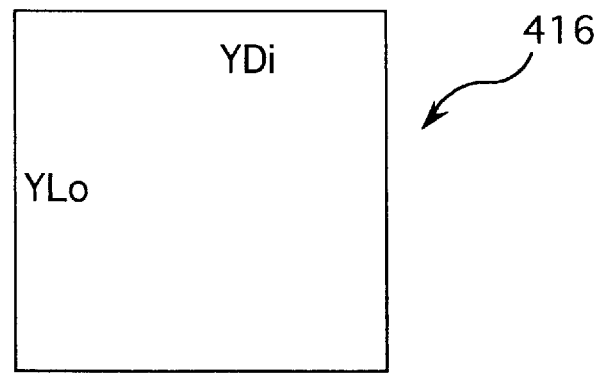
Figure 9:
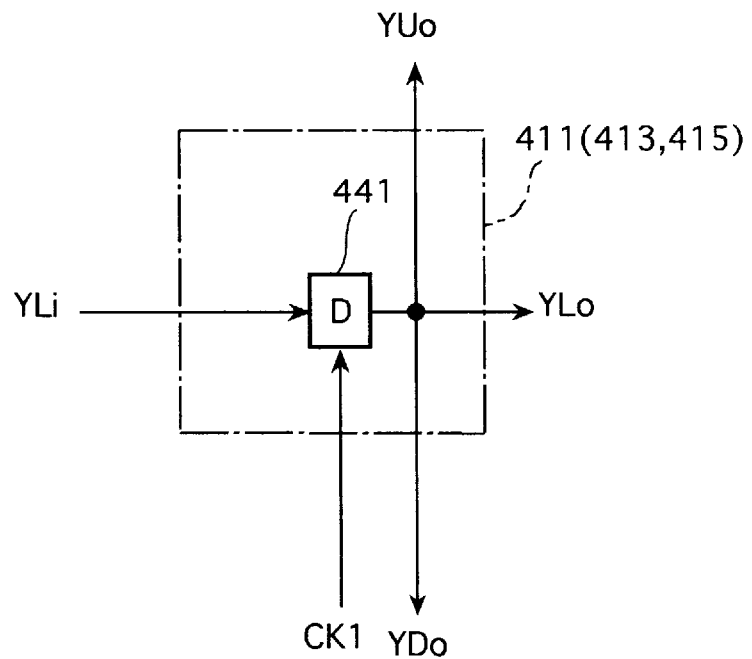
FIG. 9(a) shows a circuit of the input register unit shown in FIG. 8(a)
FIG. 9(b) also shows a circuit of the input register unit shown in FIG. 8(b)
Figure 9:
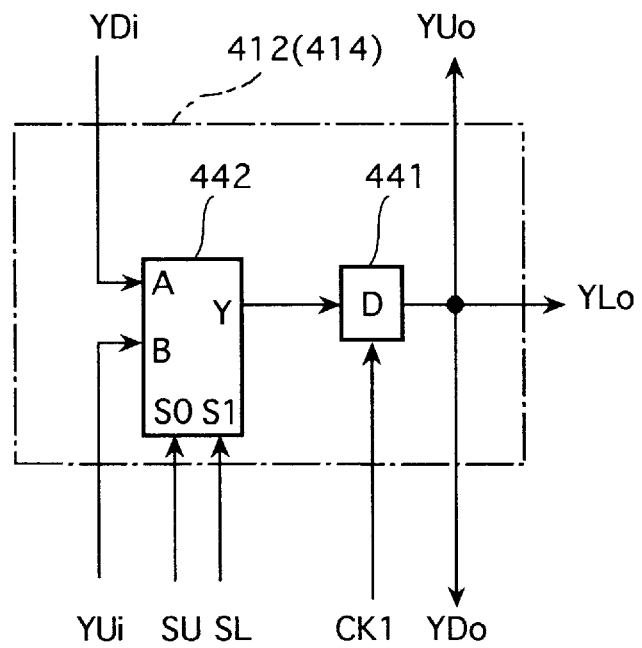
Figure 10:
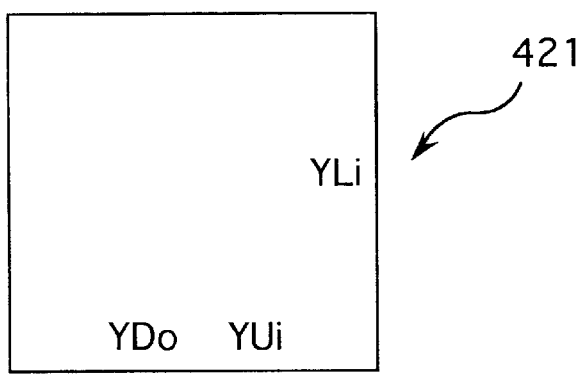
FIGS. 10(a) and 10(b) are block diagrams showing two types of upper side register units forming part of the calculating circuit shown in FIG. 2.
Figure 10:
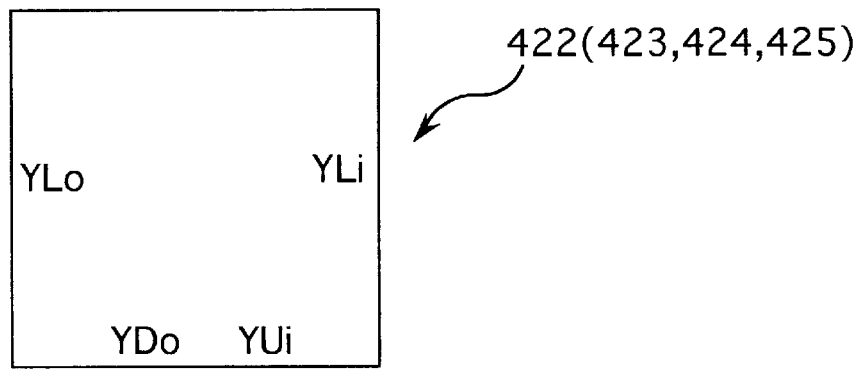

FIG. 7 shows each of the intermediate register units 323 to 336 as including a data selector 381 and a data register 382. The data selector 381 has three input ports 381a, 381b and 381c, an output port 381d and a pair of control signal input ports 381e and 381f. The data register 382 has a data input port 382a, a data output port 382b and a clock signal port 382c. The data selector 381 is operated in accordance with the selector control signals "SU" and "SL" to select from three data input lines YDi, YLi and YUi one line through which one of the pixel values of the search window data Wj is inputted to the data selector 381. The pixel value inputted to the data selector 381 is outputted from the output port Y of the data selector 381 to the data input port 382a of the data register 382. The data register 382 consists of a D-flip-flop which is so operated with the clock signal CK as to latch the pixel value from the data selector 381 in compliance with the clock signal CK and to output the registered pixel value to the search window data output lines YUo, YDo and YLo in parallel. In case of the intermediate register units 321 and 322, the data register 382 consisting of a D-flip-flop is operated with the clock signal CK as to latch the pixel value from the data selector 381 in connection with the clock signal CK and to output the registered pixel value to the search window data output lines YUo and YDo.

The above data registers 352 of the input data selecting units 350 of the processor elements 311 to 319 and the data register 382 of the intermediate register units 321 to 336 collectively constitutes a searching region 310 having a block size larger than that of each of the current and reference picture blocks. In other words, the calculating circuit 300 has a plurality of first and second transmission registers 352 and 382 as a whole function as data registering means for registering the search window data Wj in the searching region 310 with the searching region 310 covering a plurality of first pixels and a plurality of second pixels each intervening between said first pixels. The first transmission registers 352 are operated in accordance with the control signal from the timing control unit 500 and initially registers part of said search window data Wj corresponding to said first pixels, while the second transmission registers 382 are operated similarly to initially register the remaining part of said search window data Wj corresponding to said second pixels. The calculating circuit 300 is so constructed as to register the search window data Wj (j=0,1,2,3 . . . ) in the searching region 310 with a data block size larger than that of each of the reference picture blocks. In FIGS. 1 to 3, the searching region 310 is specified as the pixel block having a horizontal size (K–M+1) and a vertical size (H–N+1) to be represented by (x; 0,1,2, . . . K–M, y; 0,1,2, . . . H–N). The searching region 310 initially covers the plurality of first pixels each hatched in FIG. 3 and the plurality of second pixels each intervening between the first pixels in one of horizontal, vertical and diagonal directions of the searching region 310.

As shown in FIG. 2, the searching region 310 includes first and second columns C1, C1' and C2 each having the first pixel positions corresponding to the processor elements 311 to 319, and third columns C3 and C3' each having the second pixel positions corresponding to the intermediate register units 321 to 336 and intervening between the first and second columns C1, C1' and C2 in the horizontal direction of the searching region 310. The number of the pixel positions of the third column C3 or C3' is the same as that of each of the first and second columns C1, C1' and C2. The searching region 310 further includes first and second rows R1, R1' and R2 each having the first pixel positions, and a third row R3 containing the second pixel positions and intervening between the first and second rows R1, R1' and R2 in the vertical direction of the searching region 310. The number of the pixel positions of the third row R3 is the same as that of each of the first and second rows R1, R1' and R2. In the present embodiment, the searching region 310 includes first and second columns R1, R1' and R2 each containing the first and second pixel positions. In this case, the total number of the first and second pixel positions of each of the first row R1 and R1' is same as that of the second column R2, while the number of the first pixel positions of the first column R1 or R1' is different from that of the second column R2.

It will be understood that the above two dimensional calculating circuit 300 includes the processor elements 311 to 319 each having the first transmission register 352, the distortion calculating unit 360 as a calculator, and the intermediate register units 321 to 336 each having the second transmission register 382. The calculating circuit 300 has the first and second transmission registers 352, 382 adapted to function as data registering means for registering the search window data Wj in the searching region 310 with a block size larger than that of each of the reference picture blocks and the searching region 310 covering the first and second pixels.

The first transmission registers 352 are operated in accordance with the control signal from the timing control unit 500 and initially registers part of said search window data Wj corresponding to said first pixels, while the second transmission registers 382 are operated similarly ti initially register the remaining part of said search window data Wj corresponding to said second pixels.

As a substitute for the calculating circuit 300 including three columns of processor elements 311 to 319 and rows and columns of intermediate register units 321 to 336, a calculating circuit including three or more columns of processor elements and plural columns of intermediate register units may be adopted. The numbers of the intermediate register units intervening between plural pairs of adjacent processor elements may be equal to or different from one another. Another calculating circuit of the data registering means may be adopted to have three or more rows of processor elements and plural rows of intermediate register units included in the searching region 310. Additionally, the calculating circuit 300 is operated to function as distortion computing means including a set of calculators and a set of distortion adders. The calculators constituted by the processor elements 311 to 319 are operative in parallel to input the pixel values outputted from the current block data outputting means 100 and the pixel values outputted from the search window data outputting unit 200, and to repeatedly calculate a set of local distortion values based on the different pixel values of each of the current picture blocks outputted from the current block data outputting means 100 and the pixel values latched at the first transmission registers 352 of the processor elements 311 to 319. Each of the local distortion adders 363 of the processor elements 311 to 319 is operative to total the local distortion values calculated by each of the calculators on the basis of the different pixel values of each of the reference picture blocks and each of the current picture blocks, while the pixel values of each of the current and reference picture blocks are sequentially inputted to the calculators. The current block data outputting means 100 is able to output the pixel values of each of the current picture blocks sequentially with respective positions of the different pixels in each block the same as those of the different pixels latched at the first transmission registers 352. The pixel values of one of the current picture blocks are changed to the pixel values of another of the current picture blocks after the nine local distortion values are totaled by the local distortion adders 363.

The calculating circuit 300 and the transmission controlling unit 400 are operated in accordance with timing control signals outputted from the timing control unit 500 to have the search window data Wj transmitted in predetermined directions in the searching region 310. The pixel values of the search window data are transmitted from the second transmission registers 382 of part of the intermediate register units 321 to 336 to the first transmission registers 352 of the processor elements 311 to 319 in the searching region 310 while each of the pixel values of the search window data Wj is transmitted in the predetermined directions in the searching region 310. The transmission controlling unit 400 comprises a set of input register units each corresponding to a column of (H−N+1) pixels and operative to transmit the pixel values of the search window data from the search window data outputting means 200 to the first and second transmission registers 352 and 382 in the searching region 310.

More specifically, the transmission controlling unit 400 comprises input register units 410, 411, 412, 413, 414, 415 and 416 each operative in compliance with the clock pulses of the clock signal CK1. As shown in FIGS. 8(a) and 8(b), each of the input register units 411 to 415 has search window data input lines YUi, YDi to which the pixel values of the search window data are inputted and search window data output lines YLo, YUo and YDo from which the inputted pixel value of the search window data is outputted in parallel. Each of the input register units 411, 413 and 415 further has a search window data input line YLi to which the pixel values from the search window data outputting unit 200 are inputted. The input register 410 shown in FIG. 8(c) has a search window data input line YUi to which the pixel value from the input register unit 411 is inputted and a search window data output line YLo from which the inputted pixel value of the search window data is outputted, while the input register 416 has a search window data input line YDi to which the pixel value from the input register unit 415 is inputted and a search window data output line YLo from which the inputted pixel value of the search window data is outputted.

As shown in FIGS. 9(a) and 9(b), each of the input register units 411, 413 and 415 has a data register 441 operative to transmit the pixel value of the search window data via the search window data input line YUi and the search window data output lines YLo, YUo and YDo. Each of the input register units 412 and 414 has a data register the same as the data register 441 and an input data selector 442 operative to select from the input lines YDi and YUi one input line in accordance with the control signals SU and SL. The data inputted to the input data selector 442 is outputted to the data register 441, and latched at the data register 441 when the clock pulse of the clock signal CK1 is inputted to the data register 441. The data register 441 may be constituted by a D-flip-flop.

Figure 13:
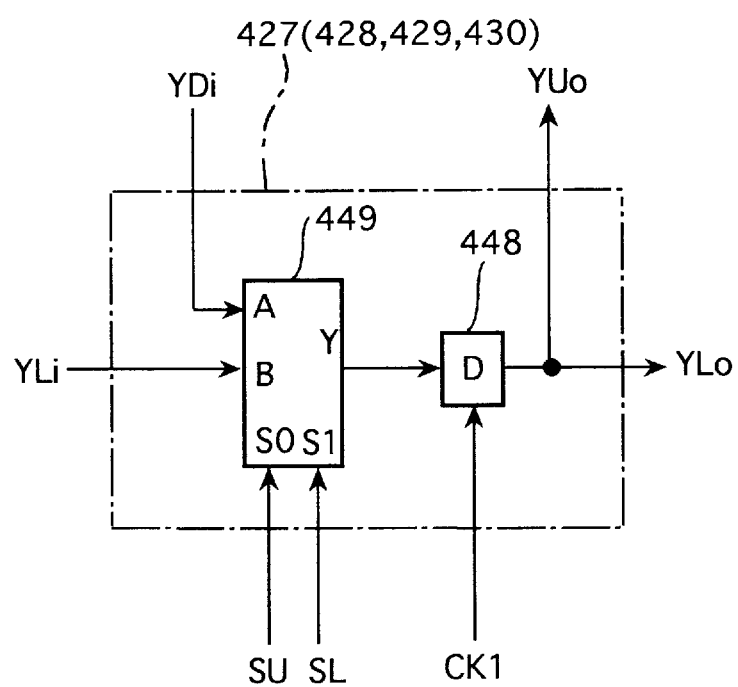
FIG. 13 shows a circuit of the lower side register unit shown in FIG. 12(b)

The transmission controlling unit 400 further comprises a set of side register units corresponding to (N−1) rows of (K−M+1) pixels, for example two rows of five side register units 421, 422, 423, 424, 425, 426, 427, 428, 429 and 430. As shown FIGS. 10(a) and 10(b), each of the side register units 422 to 425 has a data input lines YLi and YUi for inputting the pixel values of the search window data, and data output lines YLo and YDo from which the registered pixel value is outputted in parallel. The side register 421 shown in FIG. 10(a) has data input lines YLi and YUi and a data output line YDo, while the side register 426 shown in FIG. 12(a) has data input lines YLi and YDi and a data output line YUo. Each of the remaining side registers 427 to 430 has a data input lines YLi and YDi to which the pixel values of the search window data is transmitted and data output lines YLo and YUo from which the registered pixel value is outputted in parallel as shown in FIGS. 12(b) and 13. The pixel values from the input register unit 410 and 416 are respectively inputted to the side register units 425 and 430 through the data input line YLi.

Figure 11:
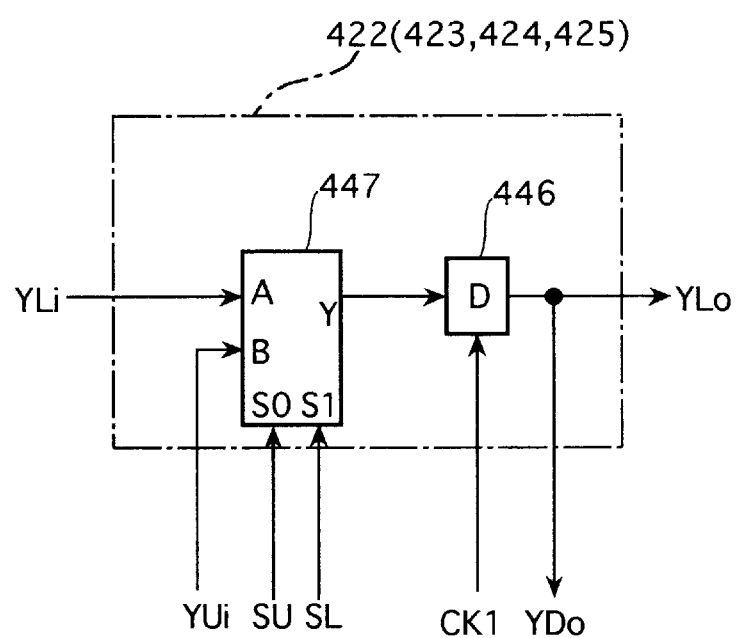
FIG. 11 shows a circuit of the upper side register unit shown in FIG. 10(b)
Figure 12:
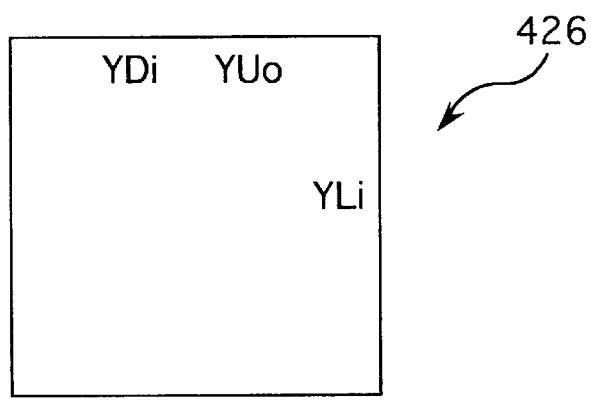
FIGS. 12(a) and 12(b) are block diagrams illustrating two types of lower side register units forming part of the calculating circuit shown in FIG. 2.
Figure 12:
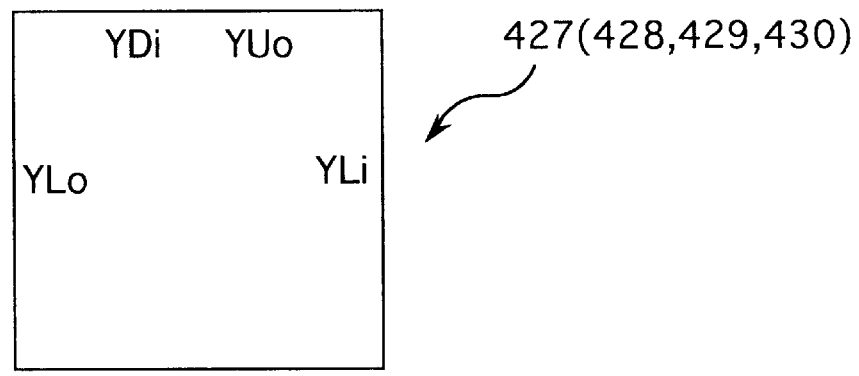

As shown in FIG. 11, each of the side register units 422 to 425 has a data register 446 operative to sequentially latch and transmit the pixel values of the search window data in compliance with the clock pulses of the clock signal CK1 and an input data selector 447 operated in accordance with the selector control signals "SU" and "SL" to select from two data input lines YLi and YUi one data input line. On the other hand, in FIG. 13, each of the side register units 427 to 430 has a data register 448 adapted to sequentially transmit the pixel values of the search window data in compliance with the clock pulses of the clock signal CK1 and an input data selector 449 operated with the selector control signals "SU" and "SL" to select from two data input lines YLi and YDi one data input line.

Thus as indicated, each of the side register units 421 to 430 is able to register one of the pixel values from the search window data input lines YDi, YUi and YLi and to output the registered pixel value through the data output lines YDo, YUo and YLo to one of the processor elements 311, 313, 314, 316, 317 and 319, the intermediate register units 323, 327, 330 and 334, and the adjacent side register units 422 to 425 and 427 to 430. Accordingly, the side register units 421 to 430 are able to input the pixel values of the reference picture blocks from the first and second transmission registers 352 and 382, and to return the inputted pixel value to the first and second transmission registers 352 and 382. In the present embodiment, the transmission controlling unit 400 is operative to control the first and second transmission registers 352 and 382 to have the pixel values of the search window data Wj registered in the first and second transmission registers 352 and 382, and simultaneously shifted in the vertical and horizontal directions of the searching region 310. The above transmission controlling unit 400 is so constructed as to control the first transmission registers 352 of the processor elements 311 to 319, the second transmission registers 382 of the intermediate register units 321 to 336, the input register units 410 to 416 and the side register units 421 to 430 to shift the pixel values of the search window data Wj in the vertical direction of the searching region 310, and further to shift the pixel values of the search window data Wj registered in part of the above registers 314 to 319, 323 to 336, 411 to 416, 422 to 425 and 427 to 430 in the horizontal direction of the searching region 310 when the pixel values of part of the search window data Wj are inputted to the first transmission registers 352 of the processor elements 317 to 319, the second transmission registers 382 of the intermediate register units 335 to 336 and the side register unit 430 from the input register units 411 to 416.

The motion vector searching apparatus further comprises a plurality of transmission paths, e.g., three transmission paths extending from the data input lines S0, S1 and S2, through which the pixel values of the search window data Wj are respectively transmitted in the vertical and horizontal directions of the searching region 310. Each of the transmission paths is constituted by part of the first transmission registers 352 of the processors elements 311 to 319 and the second transmission registers 382 of the intermediate register units 321 to 336 with respective pixel positions of the search window data Wj sequentially transmitted to each of the first transmission registers 352 of the processor elements 311 to 319 each corresponding to a certain pixel position in the searching region 310.

As shown in FIGS. 16(a) to 16(j) and FIGS. 17(a) to 17(d), the above transmission controlling unit 400 is designed to cooperate with the processor elements 311 to 319 and the intermediate register units 321 to 336 to perform time sharing of the processor elements 311 to 319 and the intermediate register units 321 to 336 to have the pixel data of two or more reference picture blocks, for example the nine reference picture blocks, respectively and sequentially transmitted to the first transmission register 352 of each of the processor elements 311 to 319 so that part of the pixel values of the search window data Wj are registered at the first transmission registers 352 and that another of the pixel values of the search window data Wj are registered at the second transmission registers 382 while the processor elements 311 to 319 are operated to calculate the distortion values based on the pixel values from the current block data outputting means 100 and the pixel values registered in the first transmission registers 352. Each of the processor elements 311 to 319 is operated to calculate a local distortion value representative of the difference between one of the pixel values of the current block data TPi inputted to the distortion calculating unit 360 through the current block data input line X and one of the pixel values of the search window data Wj registered by the data registers 352 of the processor elements 311 to 319.

Figure 14:
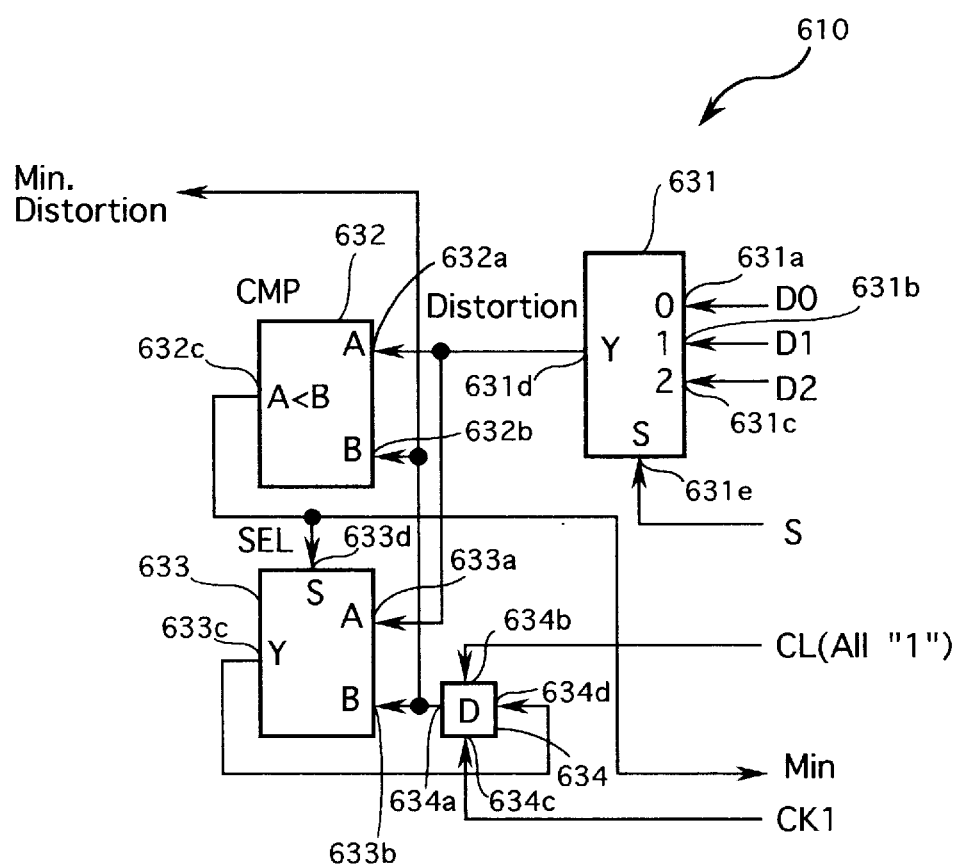
FIG. 14 is a block circuit diagram illustrating a minimum distortion detecting unit forming part of the motion vector searching apparatus and operative to detect the minimum value from a set of distortion values calculated by the calculating circuit.
Figure 15:
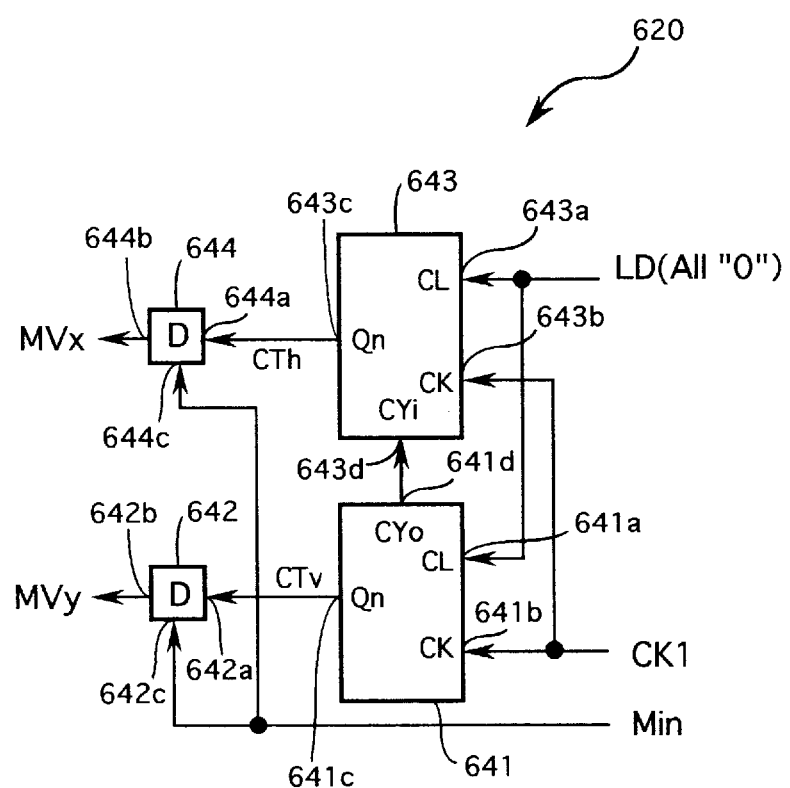
FIG. 15 is a block circuit diagram showing a vector data calculating unit forming part of the motion vector searching apparatus and adapted to calculate the coordinates of the leading end position of the motion vector in the search window.
Figure 16:
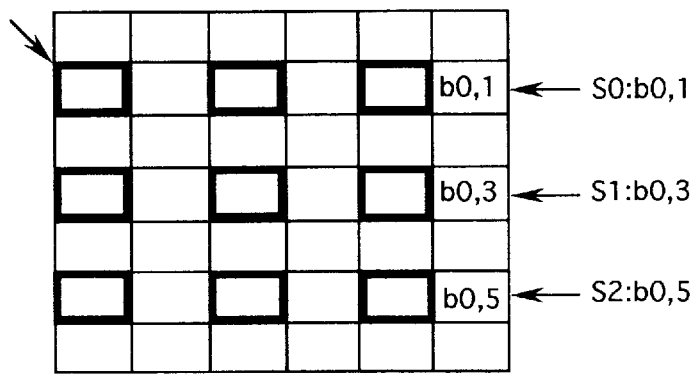
FIGS. 16(a), 16(b), 16(c) and 16(d) show possible initializing steps performed by the calculating circuit of the motion vector searching apparatus.
FIGS. 16(e), 16(f), 16(g) and 16(h) also show initializing steps succeeding to the initializing steps shown in FIGS. 16(a) to 16(d)
FIGS. 16(i) and 16(j) illustrate initializing steps succeeding to the initializing steps shown in FIGS. 16(a) to 16(h)
Figure 16:
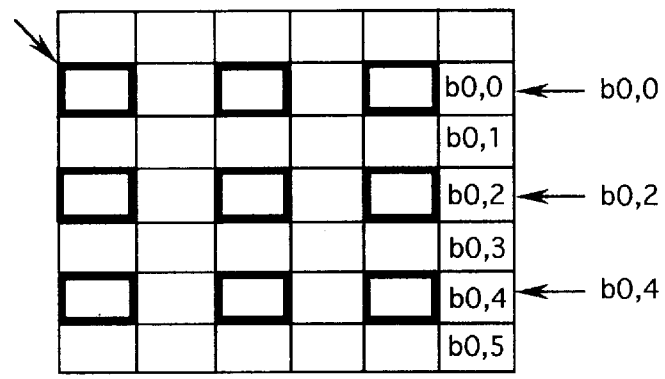
Figure 16:
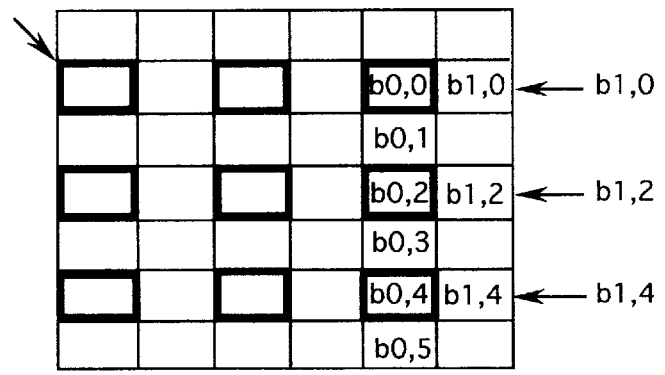
Figure 16:
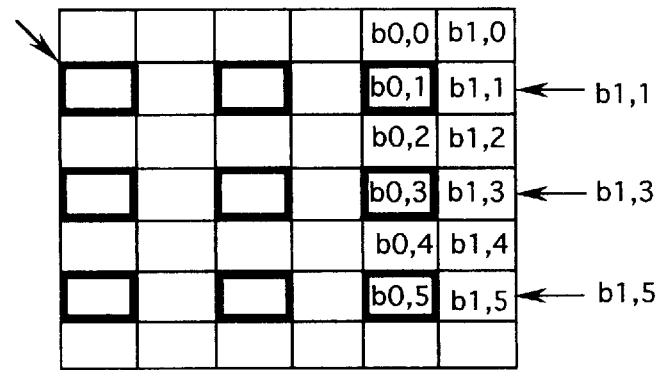
Figure 16:
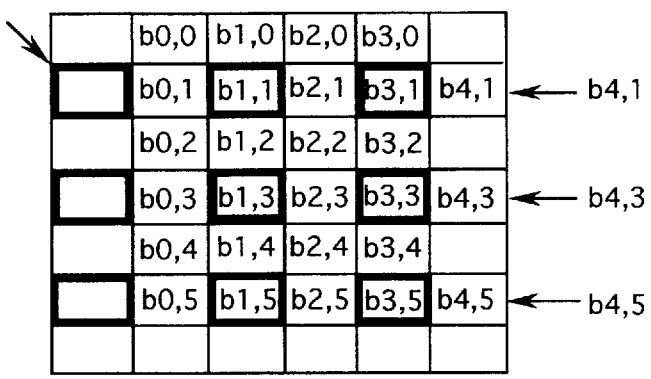
Figure 16:
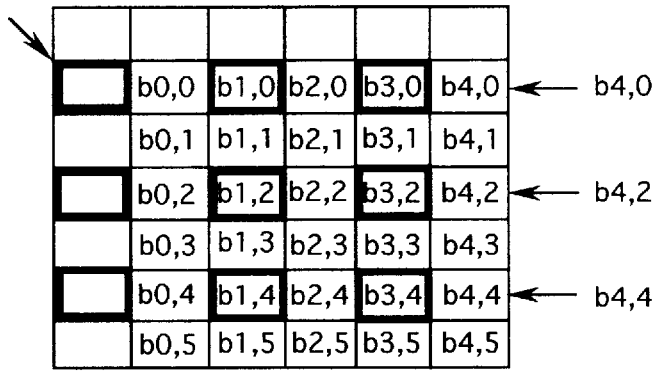

The motion vector detecting unit 600 includes a minimum distortion detecting unit 610 shown in FIG. 14 and a vector data calculating unit 620 shown in FIG. 15. The minimum distortion detecting unit 610 of the motion vector detecting unit 600 is associated with the calculating circuit 300 to detect the minimum value from a set of distortion values calculated by the calculating circuit 300. The minimum distortion detecting unit 630 has an input data selector 631, a distortion comparator 632, a minimum distortion selector 633 and a minimum distortion register 634. The input data selector 631 has three input ports 631a, 631b and 631c to which distortion transmission lines D0, D1 and D2 are respectively connected, an output port 631d from which the selected distortion value is outputted, and a control signal port 631e for the selector control signal "S". The input data selector 631 is operated with the selector control signals "S" to select from the distortion transmission lines D0, D1 and D2 one input line through which one of the distortion values is inputted to the input data selector 631. The pixel value inputted to the data selector 351 is outputted from the output port 631d of the input data selector 631 to the distortion comparator 632. The distortion comparator 632 has a first input port 632a, a second input port 632b and an output port 632c. The distortion value from the input data selector 631 is inputted to the first input port 632a of the distortion comparator 632. The distortion comparator 632 is adapted to compare the inputted distortion value A with a value B inputted to the second input port 632b and to output the distortion value A from the output port 632c when the distortion value A is less than the value B. The minimum distortion selector 633 has a first input port 633a to which the selected distortion value from the input data selector 631 is inputted, a second input port 633b to which the distortion value registered in the minimum distortion register 634 is inputted, an output port 633c from which one of the inputted distortion values is outputted in accordance with the signal "Min" from the distortion comparator 632 when the signal "Min" is inputted to the minimum distortion selector 633, and a control signal port 633d to which the data outputted from the comparator 632 is inputted as the control signal "Min". The minimum distortion register 634 has an input port 634a, a setting signal port 634b, a clock signal port 634c and a minimum distortion output port 634d. The minimum distortion register 634 is designed to hold a distortion value outputted from the distortion selector 633 in compliance with the clock signal CK1 each time when the output signal of the distortion comparator 632 is provided to the distortion selector 633. The control signal CL is supplied to the minimum distortion register 634 to set the minimum distortion register 634 at "1" after a set of distortion values indicative of the difference between the one of the current picture blocks and a set of reference picture blocks in one of the search windows are respectively inputted to the minimum distortion detecting unit 610 and compared with one another. This leads the fact that the minimum distortion value detecting unit 600 is operated to detect the minimum value from the distortion values calculated by the calculating circuit 300 every timeperiod including a initialize step and four calculating steps (a) to (d) shown in FIG. 18.

The vector data calculating unit 620 of the motion vector detecting unit 600 has a vertical position counter 641, a count value register 642, a horizontal position counter 643 and a count value register 644 as shown in FIG. 15. The vertical position counter 641 is designed to count a clock pulse of the clock signal CK1 every time when one of the calculated distortion values is inputted to the input data selector 631 of the motion vector detecting unit 600 through the distortion transmission lines "D0", "D1" and "D2" with the clock pulse of the clock signal CK1 inputted to the vertical position counter 641. The vertical position counter 641 is able to output a column count signal CY to the horizontal position counter 643 every time when the three clock pulses of the clock signal CK1 are counted by the vertical position counter 641. The count value register 642 is designed to register the output value of the vertical position counter 641, in compliance with the signal "Min" outputted from the distortion comparator 632 of the minimum distortion detecting unit 610, when the signal "Min" is inputted to the horizontal position counter 643. The horizontal position counter 643 is operated, when the column count signal CY is inputted to the horizontal position counter 643, to count every three pulses of the clock signal CK1 and to output a counted value "Qn" to the count value register 644. The count value register 644 is operated to register the output value "Qn" of the horizontal position counter 643, in compliance with the signal "Min" outputted from the distortion comparator 632 of the minimum distortion detecting unit 610, when the signal "Min" is inputted to the horizontal position counter 643.

The output count values of the vertical and horizontal position counters 641 and 643 indicate the vertical and horizontal positions of one of the reference picture blocks, most similar to a current picture block corresponding to the pixel values provided to the processor elements 311 to 319, with respect to the current picture block. In this embodiment, the count value "MVy" outputted from the count value register 642 is representative of the vertical position with respect to the pixel position b(0,0) of the search window Wj, while the count value "MVx" outputted from the count value register 644 is representative of the horizontal position with respect to the pixel position b(0,0) of the search window Wj. Therefore, the count values MVx and MVy are respectively zero when one of the reference picture blocks is positioned at the pixel position b(0,0).

The motion vector detecting unit 600 is so constructed as to produce motion vector data "MV" representative of a motion vector and minimum distortion data "MinDis" representative of a minimum distortion value on the basis of the current picture data indicating each of the current picture blocks of the current picture and the search window data representing each of the search windows of the reference picture. The motion vector data "MV" indicates the motion vector having a leading end position specified by the count values MVx and MVy and a trailing end in registry with the pixel position b(0,0) of the search window Wo. The leading end position of the motion vector represents the position of one of the reference picture blocks most similar to one of the current pictures in each of the search windows Wj. The minimum distortion data "MinDis" indicates the output value of the minimum distortion register 634 and representative of the difference between one of the current picture blocks and one of the reference picture blocks most similar to the current picture block.

As stated above, each of the motion vectors is searched by calculating a set of distortion values and detecting the minimum value from the calculated distortion values each indicative of the difference between each of the reference picture blocks and each of the current picture blocks. The motion vector data "MV" and the minimum distortion data "MinDis" constitute prediction coding data for estimating a visual motion from the reference picture to the current picture and representing the current picture with the least amount of data associated with the search window data preliminarily coded. The prediction coding data are transferable in a data communication system such as for example telephone system.

In the motion vector searching apparatus constructed as above described, the operation process for searching motion vectors is performed as follows.

At first, the first and second transmission registers are prepared to form a searching region with a block size larger than that of each of the reference picture blocks and a set of transmission paths each extending from one of the data input lines "S0", "S1", and "S2". The searching region covers a plurality of first pixels and a plurality of second pixels each intervening between the first pixels. The pixel values of the search window data Wj are transmitted in the vertical and horizontal directions of the searching region through the transmission paths. Each of the transmission paths is constituted by the first and second transmission registers 352 and 382 with respective pixel positions of the search window data Wj sequentially transmitted to one of the first transmission registers 352 corresponding to a certain pixel position in the searching region 310.

The pixel values of the current block data TPi are then sequentially outputted from the current block data outputting unit 100 to be provided to the searching region 310 in parallel, while the pixel values of the search window data Wj are transmitted through the three transmission paths to have the pixel values of each of the reference picture blocks transmitted to one of the calculators. In other words, the three groups of pixel values of the search window data Wj are outputted from the search window data outputting means 200 to be inputted to the input register units 411, 413 and 415 respectively. At this time, each of the current picture blocks of the current picture has a plurality of pixels distributed in rows and columns, and each of the search windows includes a plurality of reference picture blocks, for example nine reference picture blocks. Each of the reference picture blocks has a block size the same as that of each of the current picture blocks. In this case, a set of distortion values are calculated to be each indicative of the difference between each of the reference picture blocks in the search window and one of the current picture blocks, and by detecting the minimum value from the distortion values to specify the leading end position of each of the motion vectors.

The pixel values registered in the input register units are then transmitted to the searching region 310, i.e., the first transmission registers 352 of the processor elements 311 to 319 and the second transmission registers 382 of the intermediate register units 321 to 336.

More particularly, the pixel values of the search window data are transmitted to the search window 310 in accordance with the transmission steps as shown in FIGS. 16(a) to 16(j) and FIGS. 17(a) to 17(d). Each of these figures shows a window $W_R$ having a block size of six columns and seven rows and consisting of the first and second transmission registers 352 and 382, the input register units 410 to 416 and the side register units 421 to 430. The window $W_R$ consisting of the above registers is disclosed "register window" hereinlater.

Figure 18:
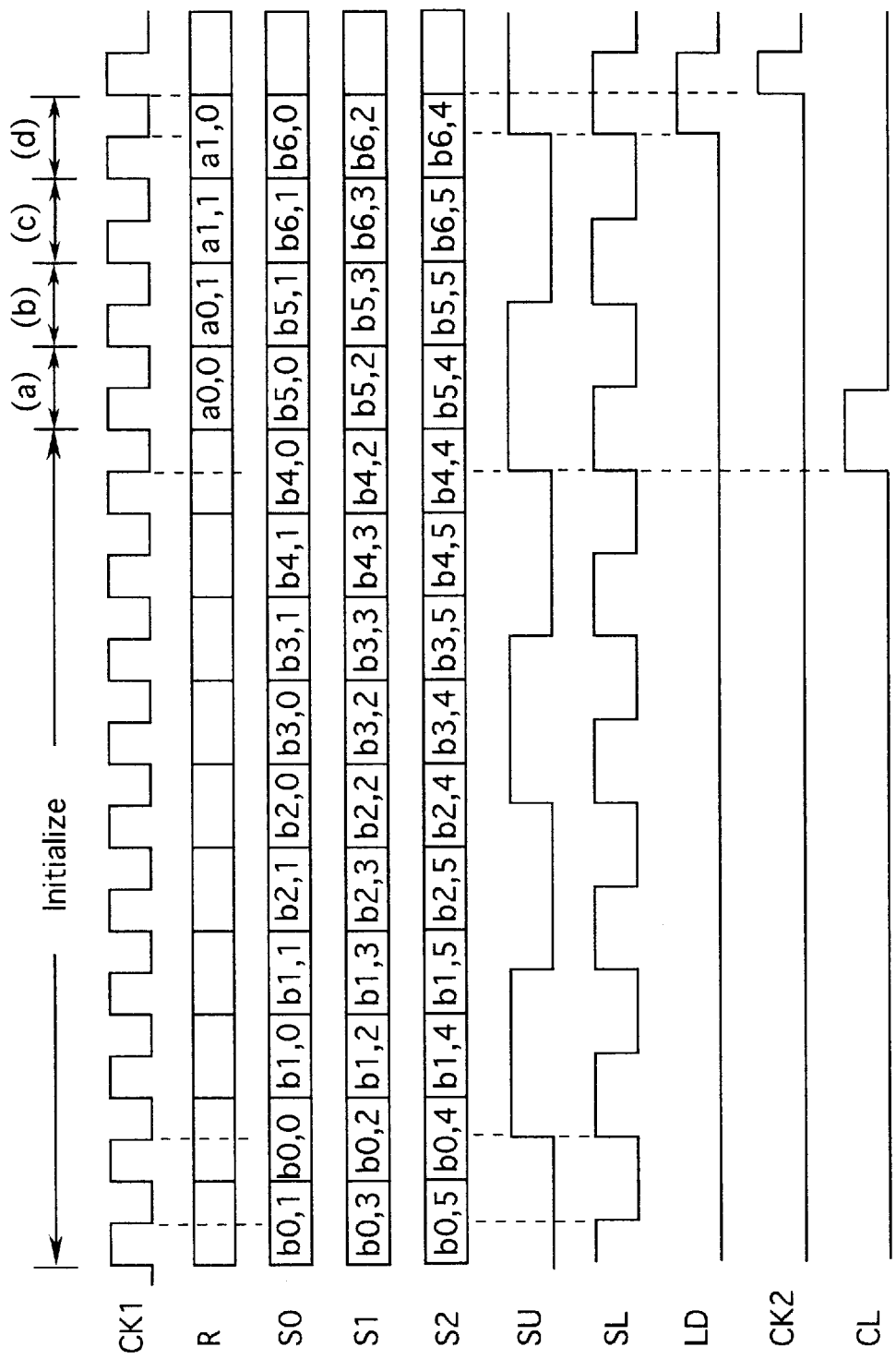
FIG. 18 is a timing diagram showing the sequence of the pulses of clock signals generated in the initializing steps shown in FIGS. 16(a) to 16(j), signals for inputting current picture data and search window data, other control signals for controlling the processor element, the intermediate register units, the side register units and the input register units of the calculating circuit.

Initialization Process:

As shown in FIG. 16(a) and FIG. 18, three pixel values b(0,1), b(0,3) and b(0,5) are respectively inputted to the input register unit 411, 413 and 415 through the input lines S0, S1 and S2. At this time, the selector control signal "SU" is equal to zero i.e., the low level, while the selector control signal "SL" is equal to one i.e., the high level. The selector control signal "SL" is then changed to zero to have the pixel values downwardly outputted from the input register units 411, 413 and 415.

Then, succeeding three pixel values b(0,0), b(0,2) and b(0,4) are respectively inputted to the input register unit 411, 413 and 415 through the input lines S0, S1 and S2 as shown in FIG. 16(b). At this time, each of the selector control signals "SU" and "SL" is maintained at zero. The selector control signals "SU" and "SL" are then changed to one respectively to have the pixel values shifted in the horizontal direction from the input register units 411 to 416 to the processor elements 317 to 319, the intermediate register units 335 and 336 and the side register unit 430.

And then, three pixel values b(1,0), b(1,2) and b(1,4) are respectively inputted to the input register unit 411, 413 and 415 through the input lines S0, S1 and S2 as shown in FIG. 16(c). At this time, the selector control signals "SU" and "SL" are respectively kept at "one". The selector control signal "SL" is then changed to zero to have the pixel values upwardly shifted in the register window $W_R$.

As shown in FIG. 16(d), succeeding three pixel values b(1,1), b(1,3) and b(1,5) are respectively inputted to the input register unit 411, 413 and 415 through the input lines S0, S1 and S2. At this time, the selector control signal "SU" is equal to one, and the selector control signal "SL" is equal to zero. Both of the selector control signals "SU" and "SL" are then changed to opposite levels to have the pixel values shifted in the horizontal direction in the register window $W_R$.

After the data shifting step, succeeding three pixel values b(2,1), b(2,3) and b(2,5) are respectively inputted to the input register unit 411, 413 and 415 through the input lines S0, S1 and S2 as shown in FIG. 16(e). At this time, the selector control signal "SU" is maintained at zero, while the selector control signal "SL" is maintained at one. The selector control signal "SU" is then changed to zero to have the pixel values downwardly shifted in the register window $W_R$.

Then, three pixel values b(2,0), b(2,2) and b(2,4) are respectively inputted to the input register unit 411, 413 and 415 through the input lines S0, S1 and S2 as shown in FIG. 16(f). At this time, each of the selector control signals "SU" and "SL" is set at zero. Both of the selector control signals "SU" and "SL" are then changed to opposite levels to have the pixel values shifted in the horizontal direction in the register window $W_R$.

And then, three pixel values b(3,0), b(3,2) and b(3,4) are respectively inputted to the input register unit 411, 413 and 415 through the input lines S0, S1 and S2 as shown in FIG. 16(g). At this time, each of the selector control signals "SU" and "SL" is maintained at one. The selector control signal "SL" is then changed to zero to have the pixel values upwardly shifted in the register window $W_R$.

As shown in FIG. 16(h), succeeding three pixel values b(3,1), b(3,3) and b(3,5) are respectively inputted to the input register unit 411, 413 and 415 through the input lines S0, S1 and S2. At this time, the selector control signal "SU" is equal to one, and the selector control signal "SL" is equal to zero. Both of the selector control signals "SU" and "SL" are then changed to opposite levels to have the pixel values shifted in the horizontal direction in the register window $W_R$.

After the data shifting step, succeeding three pixel values b(4,1), b(4,3) and b(4,5) are respectively inputted to the input register unit 411, 413 and 415 through the input lines S0, S1 and S2 as shown in FIG. 16(i). At this time, the selector control signal "SU" is equal to zero, while the selector control signal "SL" is equal to one. The selector control signal "SL" is then changed to zero to have the pixel values downwardly shifted in the register window $W_R$.

Then, three pixel values b(4,0), b(4,2) and b(4,4) are respectively inputted to the input register unit 411, 413 and 415 through the input lines S0, S1 and S2 as shown in FIG. 16(j). At this time, each of the selector control signals "SU", "SL" equals to zero. Both of the selector control signals "SU" and "SL" are then changed to opposite levels to have the pixel values shifted in the horizontal direction in the register window $W_R$.

As stated above, the first and second transmission registers 352, 382 are controlled to have part of said search window data Wj corresponding to said first pixels initially registered at said first transmission registers and another part of the search window data Wj corresponding to the second pixels initially registered at the second transmission registers 382, and to allow another part of the search window data Wj to be transmitted from the second transmission registers 382 to the first transmission registers 352 in order while the pixel values of the search window data Wj are transmitted in the predetermined direction in the searching region 310. This means that the search window data Wj is initially divided into part of the search window data Wj and the remaining part of said search window data to be transmitted from the second transmission registers 382 to the first transmission registers 352.

The register window $W_R$ forming the searching region 310 is thus initialized in accordance with the above control signals from the timing control unit 500 to be brought into a condition for performing the following distortion computation process.

Distortion Computation Process:

After the above steps of the initialization process, succeeding three pixel values b(5,0), b(5,2) and b(5,4) are respectively inputted to the input register unit 411, 413 and 415 through the input lines S0, S1 and S2 as shown in FIG. 17(a) and FIG. 18, while a pixel value a(0,0) forming part of the current picture data and representative of one of the current picture blocks is outputted from the current block data outputting unit 100 and provided in parallel to the processor elements 311 to 319. At this time, each of the processor elements 311 to 319 is operated to calculate a local distortion value based on the pixel value of the current block data TPi and the pixel value registered in the first transmission register 352 of each of the processor elements 311 to 319, and to output the local distortion value to the adjoining processor element 311, 312, 313, 314, 315 or 316. In FIG. 17(a), one of the local distortion values outputted from the distortion register 364 of the processor element 315 is shown as being an absolute value |b(2,2)−a(0,0)|. During the calculation step of the local distortions, each of the selector control signals "SU" and "SL" is equal to one. The selector control signal "SL" is then changed to zero to have the pixel values upwardly shifted in the register window $W_R$. In other words, the first transmission registers 352 of the processor elements 311 to 319, the second transmission registers 382 of the intermediate register units 321 to 336, the input register units 410 to 416 and the side register units 421 to 430 are respectively controlled by the transmission controlling unit 400 and the timing control unit 500 to shift the pixel values of the search window data Wj in the vertical direction of the searching region 310, and to shift the pixel values registered at the first and second transmission registers 352 and 382 in the horizontal direction of the searching region 310 when the pixel values of the search window data Wj are inputted to the first transmission registers 352 of the processor elements 317 to 319 and the second transmission registers 382 of the intermediate register units 335 and 336 from the input register units 411 to 415. In this embodiment, the first and second transmission registers 352 and 382 are controlled to have the pixel values of the search window data Wj registered in the first and second transmission registers 352 and 382 and simultaneously shifted in the predetermined direction of the searching region 310.

Then, succeeding three pixel values b(5,1), b(5,3) and b(5,5) are respectively inputted to the input register unit 411, 413 and 415 through the input lines S0, S1 and S2 as shown in FIG. 17(b), while a pixel value a(0,1) forming part of the current picture data and representative of one of the current picture blocks is outputted from the current block data outputting unit 100 and provided in parallel to the processor elements 311 to 319. At this time, each of the processor elements 311 to 319 is operated to calculate a local distortion value based on the inputted pixel value of the current block data TPi and the pixel value registered in the first transmission register 352 of each of the processor elements 311 to 319, and to output the calculated local distortion value to the adjoining processor element 311, 312, 313, 314, 315 or 316. In FIG. 17(b), a total value totaled by the distortion adder 363 and outputted from the distortion register 364 of the processor element 315 is shown as being an absolute value |b(2,2)−a(0,0)+|b(2,3)−a(0,1)|. During the calculation step of the local distortions, the selector control signal "SU" is equal to one, while the selector control signal "SL" is equal to zero. Both of the selector control signals "SU" and "SL" are then changed to opposite levels to have the pixel values shifted in the horizontal direction in the register window $W_R$.

And then, succeeding three pixel values b(6,1), b(6,3) and b(6,5) are respectively inputted to the input register unit 411, 413 and 415 through the input lines S0, S1 and S2 as shown in FIG. 17(c), while a pixel value a(1,1) forming part of the current picture data and representative of one of the current picture blocks is outputted from the current block data outputting unit 100. The pixel value a(1,1) of the current picture data is provided in parallel to the processor elements 311 to 319. At this time, each of the processor elements 311 to 319 is operated to calculate a local distortion value based on the inputted pixel value of the current block data TPi and the pixel value registered in the first transmission register 352 of each of the processor elements 311 to 319, and to output the calculated local distortion value to the adjoining processor element 311, 312, 313, 314, 315 or 316. In FIG. 17(c), a total value totaled by the distortion adder 363 and outputted from the distortion register 364 of the processor element 315 is shown as an absolute value |b(2,2)−a(0,0)|+ |b(2,3)−a(0,1)|+|b(3,3)−a(1,1)|. During the calculation step of the local distortions, the selector control signal "SU" is maintained at zero, while the selector control signal "SL" is kept to one. The selector control signal "SL" is then changed to zero to have the pixel values downwardly shifted in the register window $W_R$.

After the above steps, the remaining three pixel values b(6,0), b(6,2) and b(6,4) of one of the search windows are respectively inputted to the input register unit 411, 413 and 415 through the input lines S0, S1 and S2 as shown in FIG. 17(d), while a pixel value a(1,0) forming part of the current picture data and representative of one of the current picture blocks is outputted from the current block data outputting unit 100 to be provided in parallel to the processor elements 311 to 319. At this time, each of the processor elements 311 to 319 is operated to calculate a local distortion value based on the pixel value of the current block data TPi and the pixel value registered in the first transmission register 352 of each of the processor elements 311 to 319, and to output the local distortion value to the adjoining processor element 311, 312, 313, 314, 315 or 316. In FIG. 17(d), a total value totaled by the distortion adder 363 and outputted from the distortion register 364 of the processor element 315 is shown as an absolute value |b(2,2)−a(0,0)|+|b(2,3)−a(0,1)|+|b(3,3)−a(1,1) |+|b(3,2)−a(1,0)|. During the calculation step of the local distortions, each of the selector control signals "SU" and "SL" is equal to zero. Both of the selector control signals "SU" and "SL" are then changed to opposite levels to have the pixel values shifted in the horizontal direction in the register window $W_R$.

Figure 19:
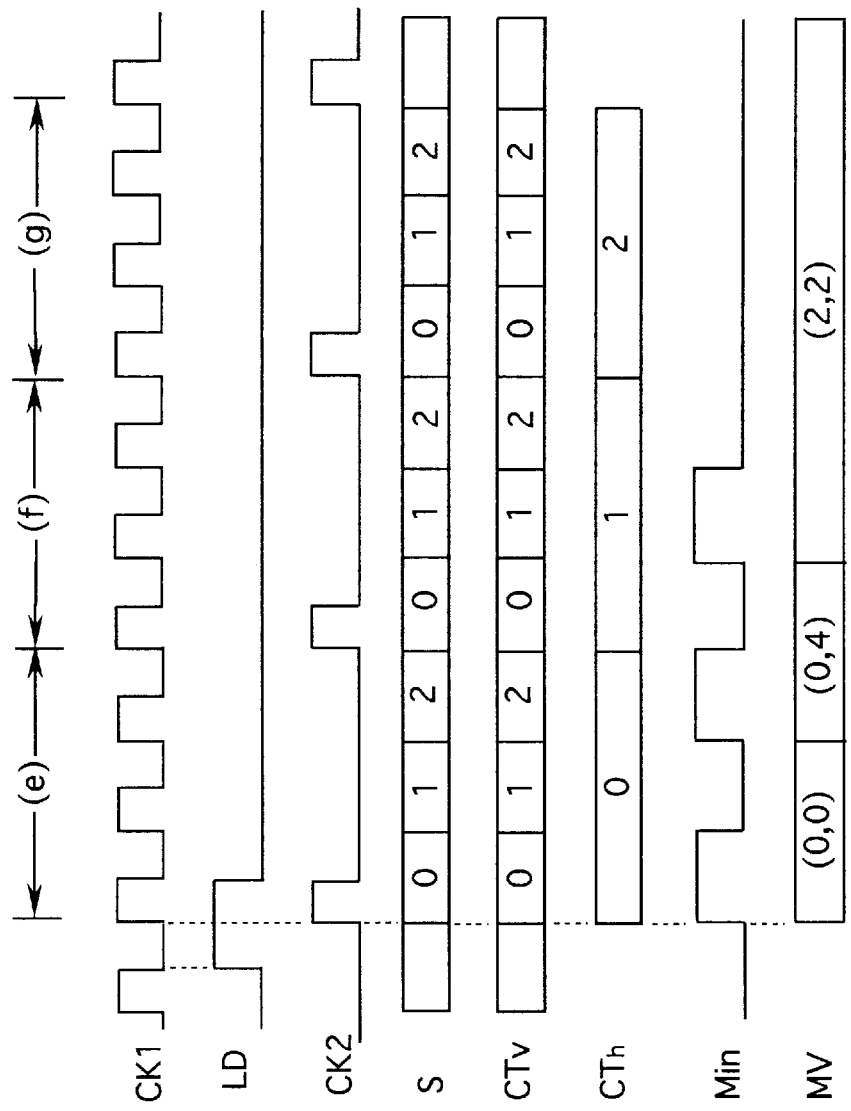
FIG. 19 is a timing diagram showing the sequence of the pulses of clock signals produced in the calculating steps shown in FIGS. 17(a) to 17(d), signals for controlling the minimum distortion detecting unit and the vector data calculating unit and other signals outputted from the motion vector detecting unit.

The total values respectively outputted from the processor elements 311 to 319 are then transmitted to the motion vector detecting unit 600 from the processor elements 311 to 319 through the distortion transmission lines D0, D1 and D2, shown in FIGS. 1 and 14, in compliance with the clock pulses of the clock signal CK2 shown in FIG. 19. At this time, each of the total values of the local distortion values is equivalent to a distortion value representative of the difference between one of the current picture blocks and one of the reference picture blocks.

When each of the total values of the local distortion values is transmitted to the motion vector detecting unit 600 from the processor elements 311 to 319 through one of the distortion transmission lines D0, D1 and D2, the minimum distortion detecting unit 610 of the motion vector detecting unit 600 is operated to detect the minimum value from the total values, i.e., a set of distortion values calculated by the calculating circuit 300. The input data selector 631 is then operated with the selector control signals "S" to select from three distortion transmission lines D0, D1 and D2 one line through which one of the total values is inputted to the input data selector 631. The total value is then transmitted from the input data selector 631 to the first input port 632a of the distortion comparator 632, and compared with a value inputted to the second input port 632b. When the first input value, i.e., the total value "A" is less than the second input value "B", the pulse of the signal "Min" is outputted from the output port 632c of the distortion comparator 632 as shown in FIG. 14.

At this time, the minimum distortion selector 633 is operated in compliance with the output signal "Min" to select from two input distortion values inputted to the input ports 633a and 633b one distortion value. When the distortion value "A" from the input data selector 631 is less than the distortion value "B" registered in the minimum distortion register 634, the distortion value "A" from the input data selector 631 is selected by the minimum distortion selector 633. On the contrary, the distortion value "B" from the minimum distortion register 634 is selected by the minimum distortion selector 633 when the distortion value "B" registered in the minimum distortion register 634 is less than the distortion value "A" from the input data selector 631. The distortion value selected by the minimum distortion selector 633 is then outputted to the minimum distortion register 634, wherein the distortion value is registered as the minimum distortion value.

In the mean time, a pulse of the clear signal "CL" is generated prior to the above calculation process, and inputted to the minimum distortion registers 634 of the processor elements 311 to 319 to set the minimum distortion register 634 at "1". Each of the minimum distortion registers 634 of the processor elements 311 to 319 is therefore cleared and set at "1" when the pulse of the clear signal "CL" is inputted to each of the minimum distortion registers 634. This results in the fact that the minimum distortion value detecting unit 600 is operated to detect the minimum value from the distortion values calculated by the calculating circuit 300 every timeperiod including the above initialize and calculation processes shown in FIG. 18.

On the other hand, each of the clock pulses of the clock signal CK1 is counted by the vertical position counter 641 while each of the calculated distortion values from the calculating circuit 300 is inputted to the input data selector 631 of the motion vector detecting unit 600. As shown in FIG. 15, the count value CTv of the vertical position counter 641 varies from zero to two in response to the selector control signal "S" while every three distortion values from the calculating circuit 300 are inputted to the input data selector 631. The column count signal CY is then outputted from the vertical position counter 641 to the horizontal position counter 643 when the three distortion values from the calculating circuit 300 are inputted to the input data selector 631. The count value CTh of the horizontal position counter 643 varies from zero to two in response to the column count signal CY while three columns of the distortion values from the calculating circuit 300 are inputted to the input data selector 631 of the motion vector detecting unit 600. The output count values CTv and CTh of the vertical and horizontal position counters 641 and 643 indicate the vertical and horizontal positions of one of the reference picture blocks with respect to one of the current picture blocks. The reference picture block assuming the position represented by the count values CTv and CTh is most similar to one of the current picture blocks corresponding to the pixel values provided to the processor elements 311 to 319.

In the present embodiment, the motion vector data "MV" shown in FIG. 15 and representative of one of the motion vectors is varied from (0,0) to (2,2) while the three columns of distortion values from the calculating circuit 300 are inputted to the input data selector 631 of the motion vector detecting unit 600. This means that the motion vector MV extends from the trailing end position (0,0) of the search window to the leading end position (2,2). Each of the motion vectors MV is specified in accordance with the above steps as a vector having a leading end position represented by the count values MVx, MVy and a trailing end position in registry with the pixel position b(0,0) of the search window. The pixel position b(0,0) is in registry with the pixel position (0,0) in one of the current picture blocks.

The motion vector data "MV" representative of a motion vector and the minimum distortion data "MinDis" representative of a minimum distortion value are produce by the motion vector detecting unit 600, as aforementioned, based on the current picture data representing each of the current picture blocks of the current picture and the search window data representing each of the search windows of the reference picture.

In the mean time, the pixel values of each of the search window data Wj are transmitted by the register window $W_R$ during the above calculation process to have the search window data Wj transmitted in the predetermined directions in the searching region 310 as shown in FIGS. 17(*a*) to 17(*d*). More specifically, part of the pixel values of the search window data Wj are transmitted from the second transmission registers 382 of the intermediate register units 321, 322, 323, 325, 327, 328, 329, 330, 332, 334, 335, 336 to the first transmission registers 352 of the processor elements 311 to 319 in the searching region 310, and each of the remaining pixel values of the search window data Wj are transmitted between adjoining two registers forming part of the intermediate register units 321 to 336 and the side register units 421 to 430. It will be under stood that the search window data Wj is initially divided into first and second pixel data, each of which forms part of the data representative of the reference picture blocks, to have the pixel values of different pixels of each of the reference picture blocks.

The search window data Wj has the block size of six columns of size pixels, that is, the search window Wj includes 36 pixels although the number of the processor elements 311 to 319 is nine. However, the pixel values of search window data Wj of 6 columns and 6 rows are able to be transmitted to the processor elements 311 to 319 by the reason that the search window data Wj is divided into the first and second pixel data of each of the reference picture blocks, and that the first and second transmission registers 352 and 382 are respectively controlled to perform time sharing of each of the first and second transmission registers 352 and 382 and the processor elements 311 to 319 to have the pixel data of the first and second pixel data respectively and sequentially transmitted to the first transmission registers 352 of the processor elements 311 to 319. In this case, each of the pixel values of the current picture blocks is inputted to the processor elements 311 to 319 in parallel to repeatedly calculate the local distortion values based on the inputted pixel value of the current picture block correspond to those of the pixel values registered in the first transmission registers 352 of the processor elements 311 to 319. In addition, the local distortion values calculated by the processor elements 311 to 319 are totaled while the different pixel values of each of the current and reference picture blocks are sequentially inputted to the processor elements. The pixel values to be inputted to the processor elements 311 to 319 and representative of each of the current picture blocks may be changed after the local distortion values are totaled.

The aforementioned calculating circuit 300 results in a simple and small scale circuit due to the fact that each of the intermediate register units 321 to 336 is smaller and simpler than each of the processor elements 311 to 319. In addition, the number of the intermediate register units 321 to 336 should be greater than that of the processor elements 311 to 319. Accordingly, it is possible to reduce the amount of computation for calculating the distortions to searching motion vectors, in comparison with the prior art motion vector searching apparatus designed to implement the so-called full search block matching, even if the searching region is extensive.

Figure 20:
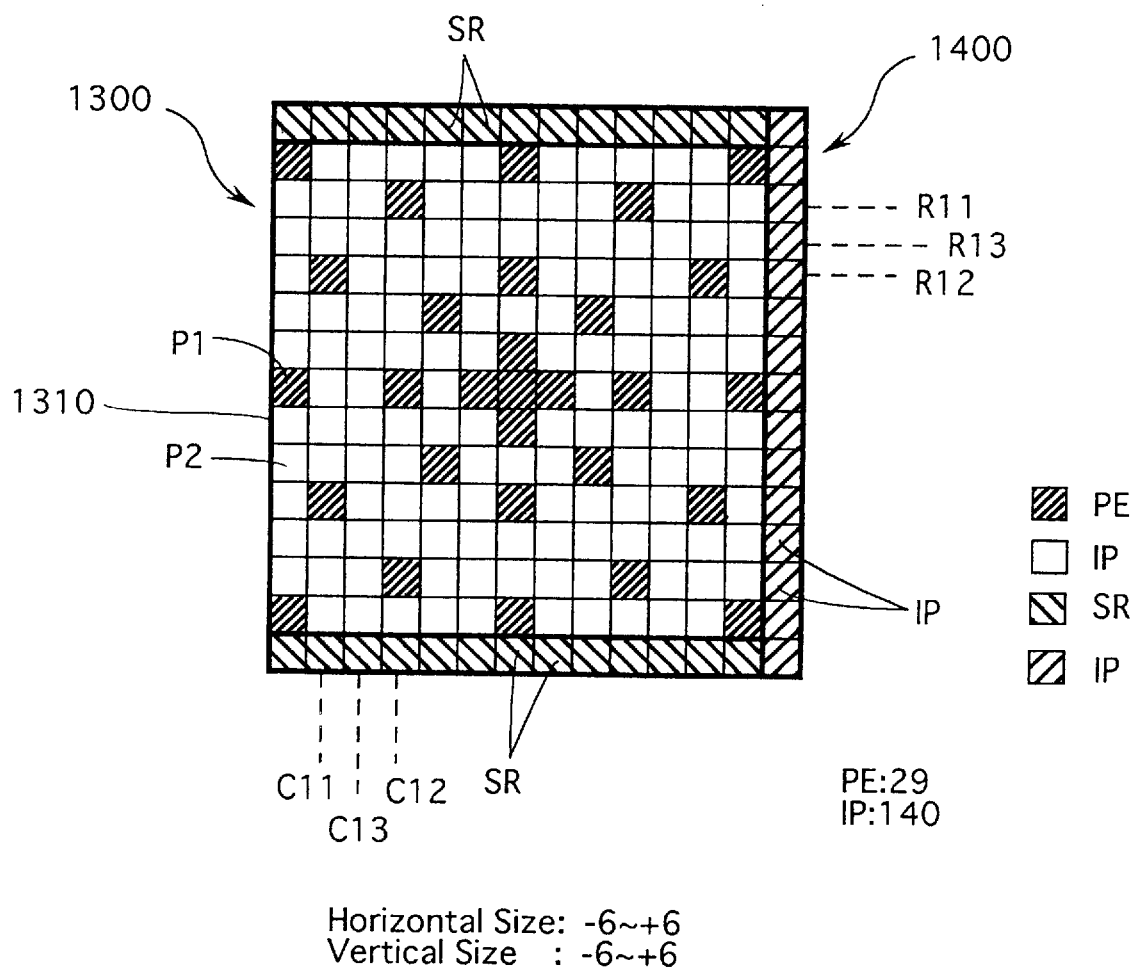
FIG. 20 is a plan view of a second embodiment of the motion vector searching apparatus according to the present invention.

In FIG. 20, a second embodiment of the motion vector searching apparatus according to the present invention is shown as comprising a calculating circuit 1300 including a plurality of processor elements PE and a plurality of intermediate register units IP collectively forming a searching region 1310, and a transmission controlling unit 1400 associated with the calculating circuit 1300. Each of the processor elements PE and intermediate register units IP is the same as one of the above processor elements 311 to 319 and the intermediate register units 321 to 336. The searching region 1310 includes 13 columns of 13 pixels as shown in FIG. 20, wherein first and second columns C11 and C12 are included. Each of the first and second columns C11 and C12 contains at least one first pixel position P1 corresponding to the first transmission register 352 of each of the processor elements PE and a plurality of second pixel positions P2 corresponding to the second transmission registers 382 of part of the intermediate register units IP. The totaled number of the first and second pixel positions P1 and P2 of the first column C11 is equal to that of the second column C12, while the number of the first pixel positions P1 of the first column C11 is different from that two of the second column C12. In other words, the number of the processor elements PE in the first column C11 is different from the number of the processor elements PE in the second column C12 in the calculating circuit 300. Further, the searching region 1310 includes first and second rows R11 and R12 each including the first and second pixel positions P1 and P2. The total number of the first and second pixel positions P1 and P2 in the first row R11 is equal to that of the second row R12, while the number of the first pixel positions P1 in the first row R11 is different from the number of the first pixel positions P1 in the second row R12. The searching region 1310 further includes a third column C13 consisting of the second pixels P2 and intervening between the first and second columns C11 and C12 in the horizontal direction and a third row R13 containing the second pixels P2 and intervening between the first and second rows R11 and R12 in the vertical direction. The number of the second pixel positions P2 of the third column C13 is the same as the number of the first and second pixel positions P1 and P2 of each of the first and second columns C11 and C12, and the number of the pixel positions P2 of the third row R13 is the same as that of each of the first and second rows R11 and R12.

The calculating circuit 1300 includes a set of calculators each forming part of the processor elements PE and respectively operative to calculate the distortion values based on the pixel values of the current picture blocks outputted from the current block data outputting means and the pixel values latched at the first transmission registers 352 of the processor elements PE. The numbers of the intermediate register units IP intervening between plural pairs of adjacent processor elements PE may be equal to or different from one another. The calculators constituted by the processor elements PE are operative in parallel to input the pixel values outputted from the current block data outputting means and the pixel values outputted from the search window data outputting unit. The pixel values of one of the current picture blocks are changed to the pixel values of another of the current picture blocks when the certain number of local distortion values are totaled by the local distortion adders of the PE.

The transmission controlling unit 1400 is adapted to control the processor elements PE and the intermediate register units IP to have the search window data transmitted in predetermined directions in the searching region 1310. The pixel values of the search window data are transmitted from the second transmission registers of part of the intermediate register units IP to the first transmission registers of the processor elements PE in the searching region 1310 while each of the pixel values of the search window data is transmitted in the predetermined directions in the searching region 1310. Specifically, the transmission controlling unit 1400 comprises a set of input register units IR, for example, 15 input registers corresponding to a column of (H−N+1) pixels and the same as one of the input registers 410 to 416. The transmission controlling unit 1400 further comprises a set of side register units corresponding to (N−1) rows of (K−M+1) pixels, for example two rows of thirteen side register units SR. The side register units SR are able to input the pixel values of the reference picture blocks from the processor elements and the intermediate register units in the searching region 1310, respectively, and to return the latched pixel values to the processor elements and the intermediate register units in the searching region 1310. In this embodiment, at least one reference picture block located in the center of each of the search window is densely searched in comparison with the above first embodiment, thereby enabling to improve the precision of the block matching for searching motion vectors.

Figure 21:
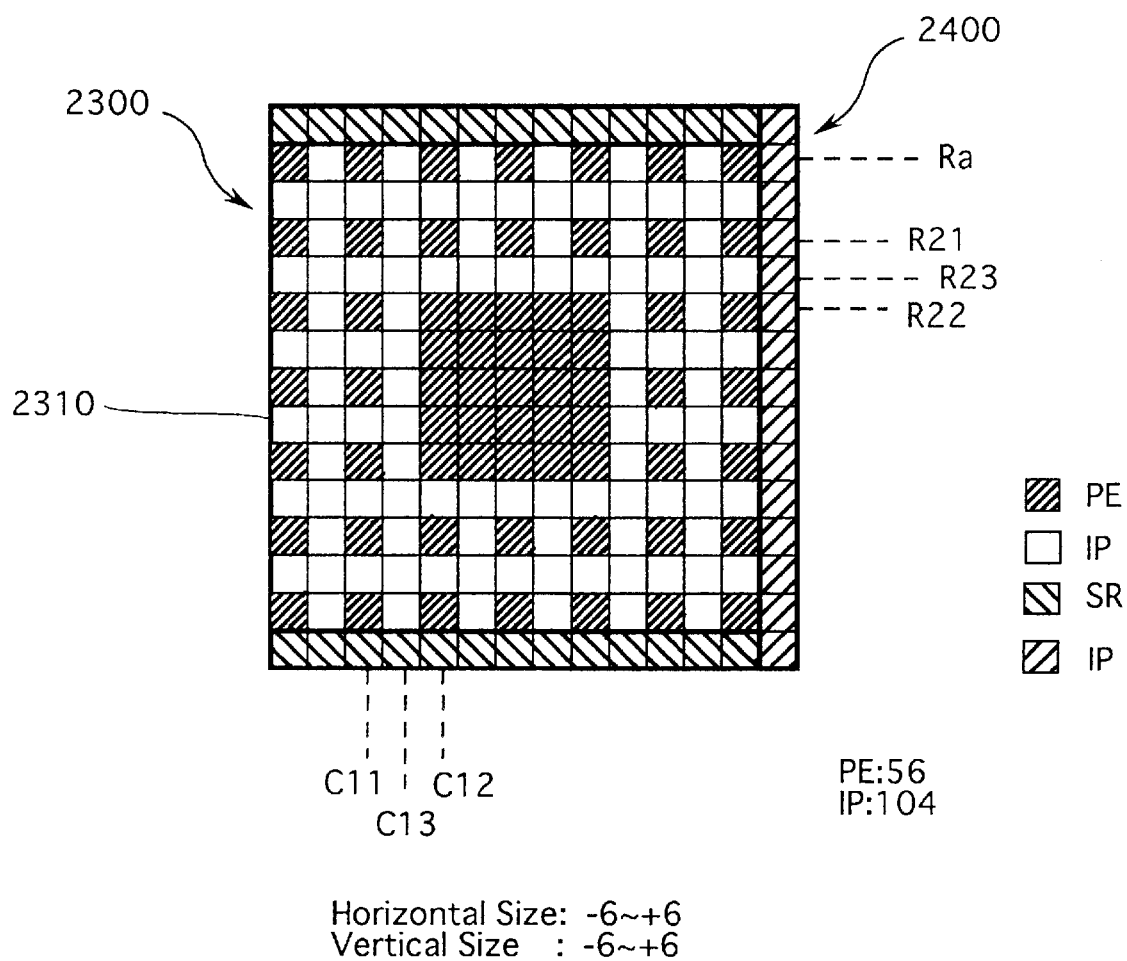
FIG. 21 is a plan view of a third embodiment of the motion vector searching apparatus according to the present invention.

FIG. 21 shown a third embodiment of the motion vector searching apparatus according to the present invention. The motion vector searching apparatus comprises a calculating circuit 2300 including a plurality of processor elements PE and a plurality of intermediate register units IP collectively forming a searching region 2310, and a transmission controlling unit 2400 associated with the calculating circuit 2300. Each of the processor elements PE and intermediate register units IP is the same as one of the above processor elements 311 to 319 and the intermediate register units 321 to 336. The searching region 2310 includes 13 columns of 13 pixels as shown in FIG. 21, wherein first and second columns C21 and C22 are included. Each of the first and second columns C21 and C22 consists of at least one first pixel position P1 corresponding to the first transmission register 352 of each of the processor elements PE and a plurality of second pixel positions P2 corresponding to the second transmission registers 382 of part of the intermediate register units IP. The number of the first and second pixel positions P1 and P2 of the first column C21 is equal to that of the second column C22, while the number of the first pixel positions P1 of the first column C21 is different from that of the second column C22. In other words, the number of the processor elements PE in the first column C21 is different from the number of the processor elements PE in the second column C22 in the calculating circuit 2300. Further, the searching region 2310 includes first and second rows R21 and R22 each consisting of the first and second pixel positions P1 and P2. The total number of the first and second pixel positions P1 and P2 in the first row R21 is equal to that of the second row R22, while the number of the first pixel positions PI in the first row R21 is different from the number of the first pixel positions P1 in the second row R22. The searching region 2310 further includes a third column C23 consisting of the second pixels P2 and intervening between the first and second columns C21 and C22 in the horizontal direction and a third row R23 containing the second pixels P2 and intervening between the first and second rows R21 and R22 in the vertical direction. The number of the second pixel positions P2 of the third column C23 is the same as the number of the first and second pixel positions P1 and P2 of each of the first and second columns C21 and C22, and the number of the pixel positions P2 of the third row R23 is the same as that of each of the first and second rows R21 and R22. The calculators constituted by the processor elements PE are operative in parallel to input the pixel values outputted from the current block data outputting means and the pixel values outputted from the search window data outputting unit. The pixel values of one of the current picture blocks are changed to the pixel values of another of the current picture blocks when the certain number of local distortion values are totaled by the local distortion adders of the PE.

The transmission controlling unit 2400 is adapted to control the processor elements PE and the intermediate register units IP to have the search window data transmitted in predetermined directions in the searching region 2310. The pixel values of the search window data are transmitted from the second transmission registers of part of the intermediate register units IP to the first transmission registers of the processor elements PE in the searching region 2310 while each of the pixel values of the search window data is transmitted in the predetermined directions in the searching region 2310. Specifically, the transmission controlling unit 2400 comprises a set of input register units I, for example, fifteen input registers corresponding to a column of (H−N+1) pixels and the same as one of the input registers 410 to 416. The transmission controlling unit 2400 further comprises a set of side register units corresponding to (N−1) rows of (K−M+1) pixels, for example two rows of thirteen side register units SR. The side register units SR are able to input the pixel values of the reference picture blocks from the processor elements PE and the intermediate register units IP in the searching region 2310, respectively, and to return the latched pixel values to the processor elements PE and the intermediate register units IP in the searching region 2310. In this embodiment, at least one reference picture block located in the center of each of the search window is fully searched as in the case of the full search block matching, thereby enabling to improve the precision of the block matching for searching motion vectors.

Figure 22:
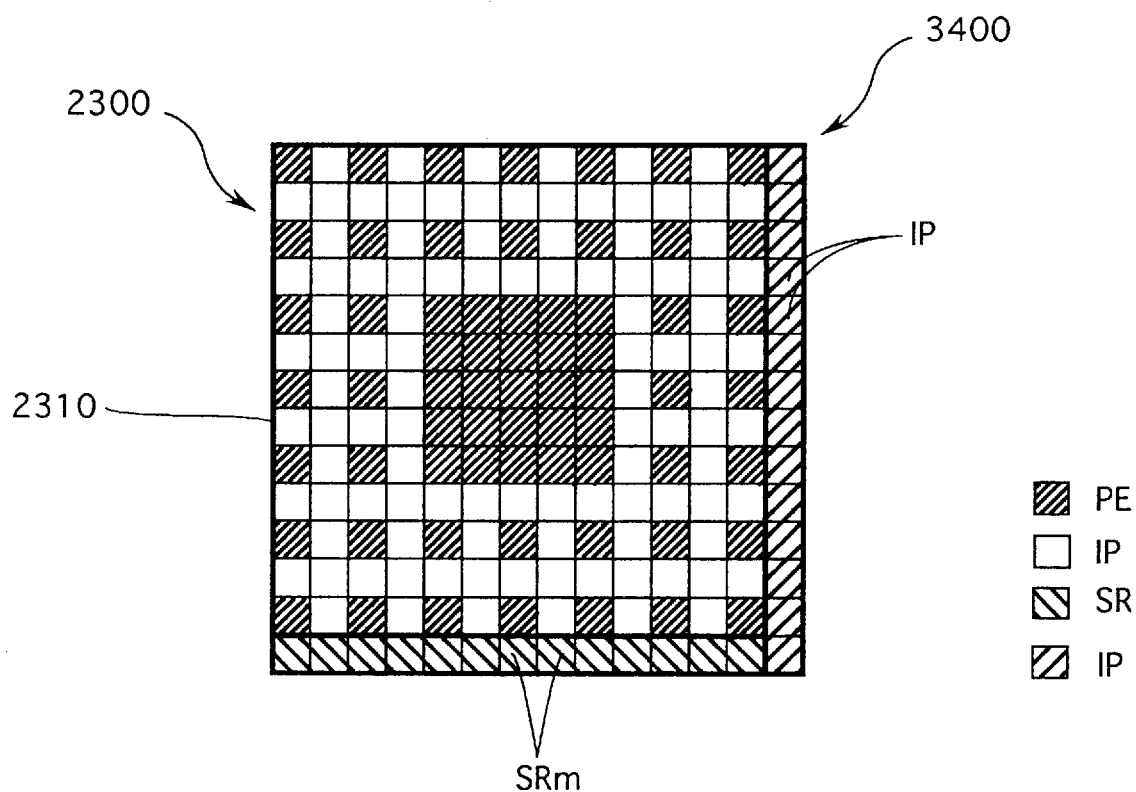
FIG. 22 is a plan view of a fourth embodiment of the motion vector searching apparatus according to the present invention.
Figure 23:
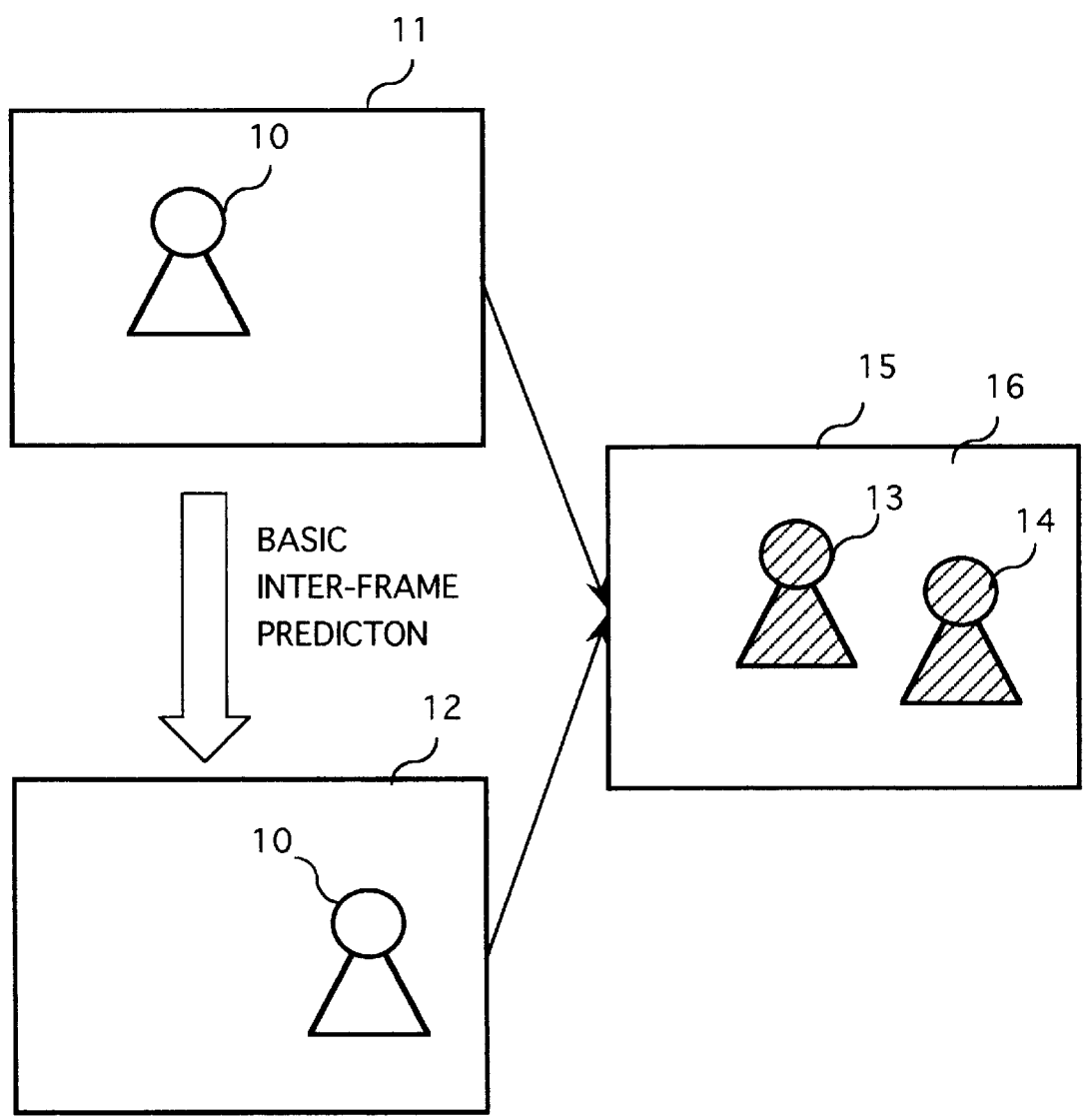
FIG. 23 is an explanatory view showing the procedure of a prior art prediction coding known as the basic inter-frame prediction which is utilized for video data compression.
Figure 24:
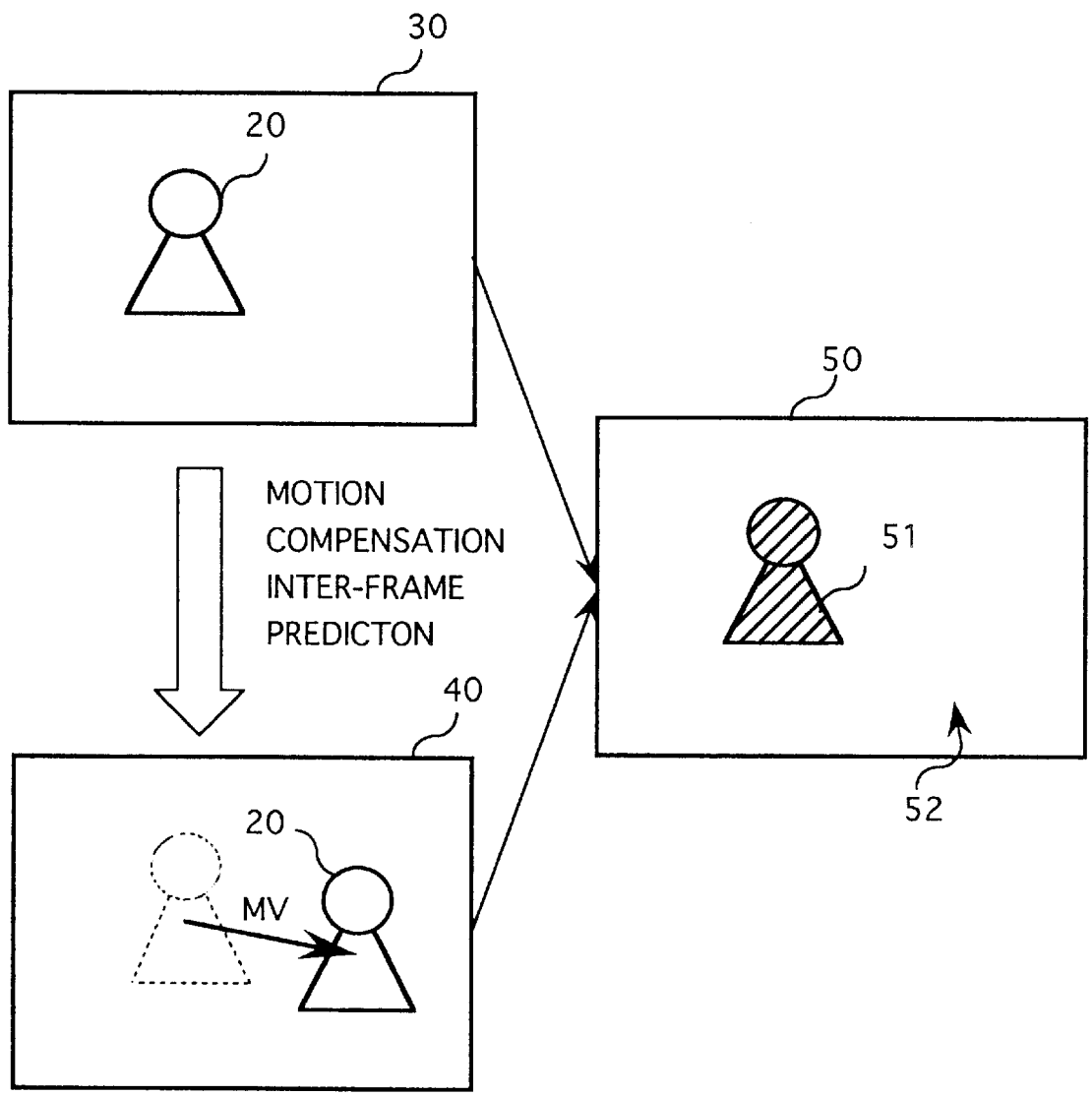
FIG. 24 is a diagrammatic view showing the procedure of another prior art prediction coding known as the motion compensation inter-frame prediction which is utilized for the video data compression.
Figure 25:
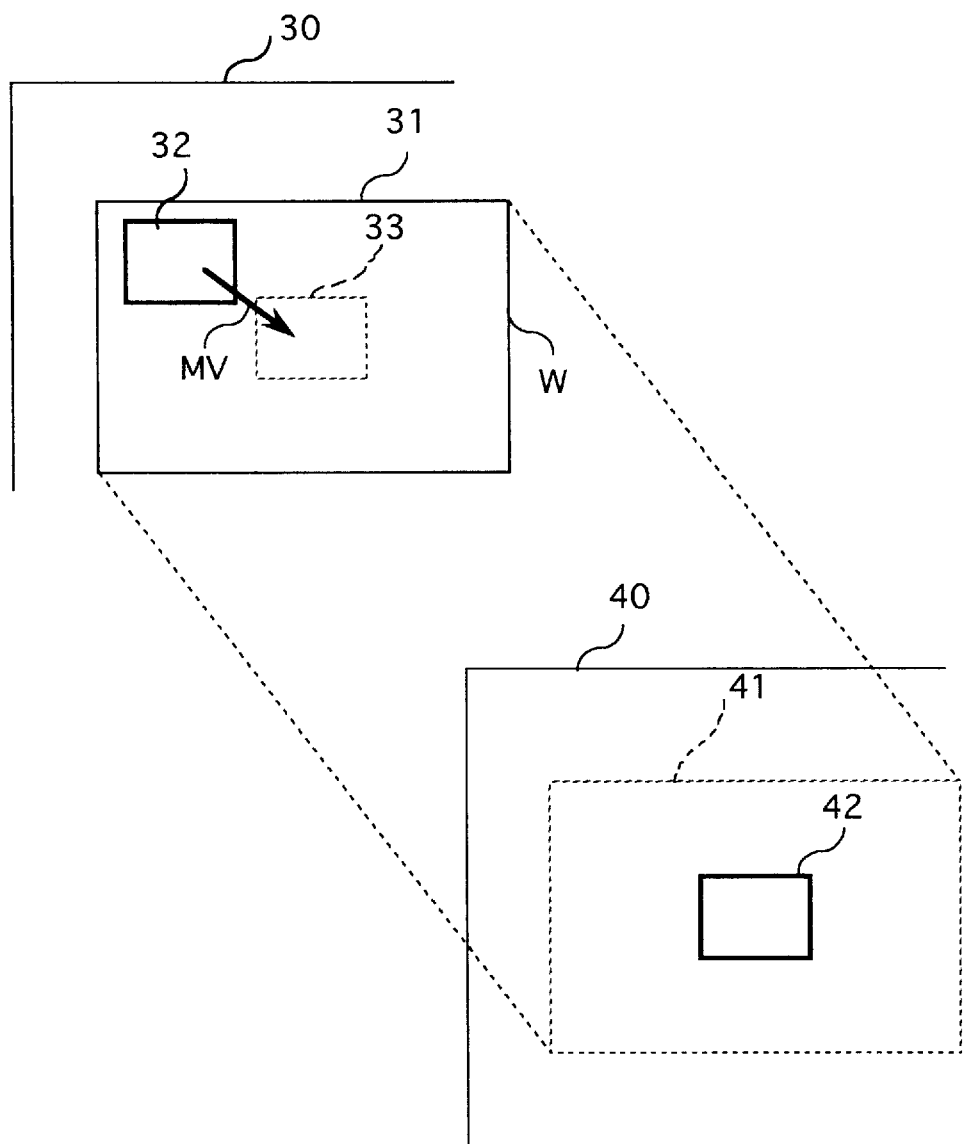
FIG. 25 is an explanatory illustration showing a current picture and a reference picture with the procedure of the prior-art motion compensation according to the block matching method.
Figure 26:
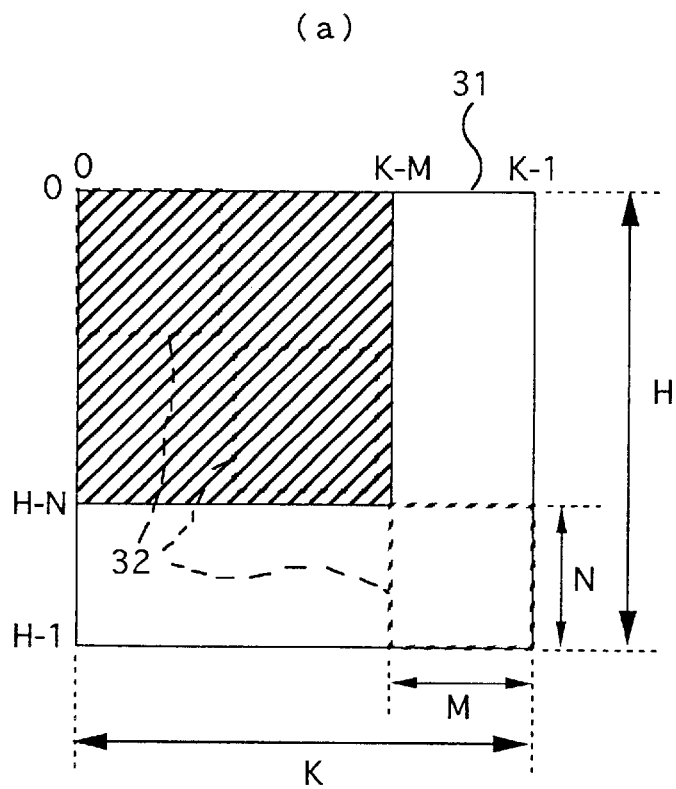
FIG. 26(a) shows the positional relationship between a plurality of reference picture blocks in the search window shown in FIG. 25.
FIG. 26(b) shows horizontal and vertical sizes of a current picture block forming part of the current picture shown in FIG. 25.
Figure 26:
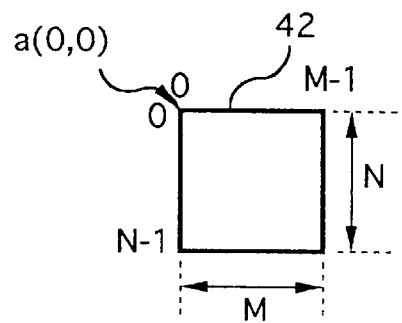
Figure 27:
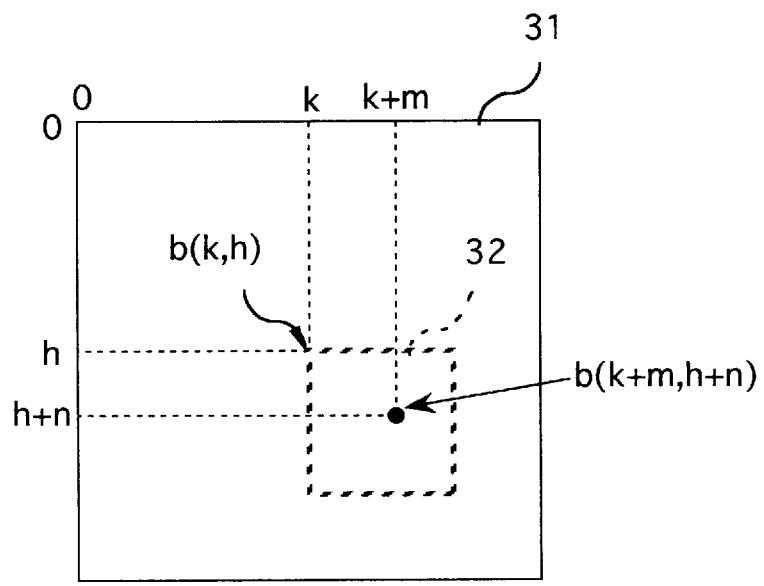
FIGS. 27(a) illustrates a pixel position in one of the reference picture blocks shown in FIG. 26(a)
FIGS. 27(b) shows a pixel position in the current picture block corresponding to the above pixel position in the reference picture block shown in FIG. 27(a)
Figure 27:
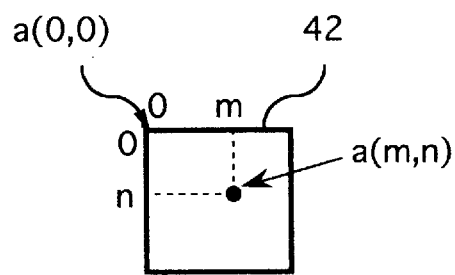
Figure 28:
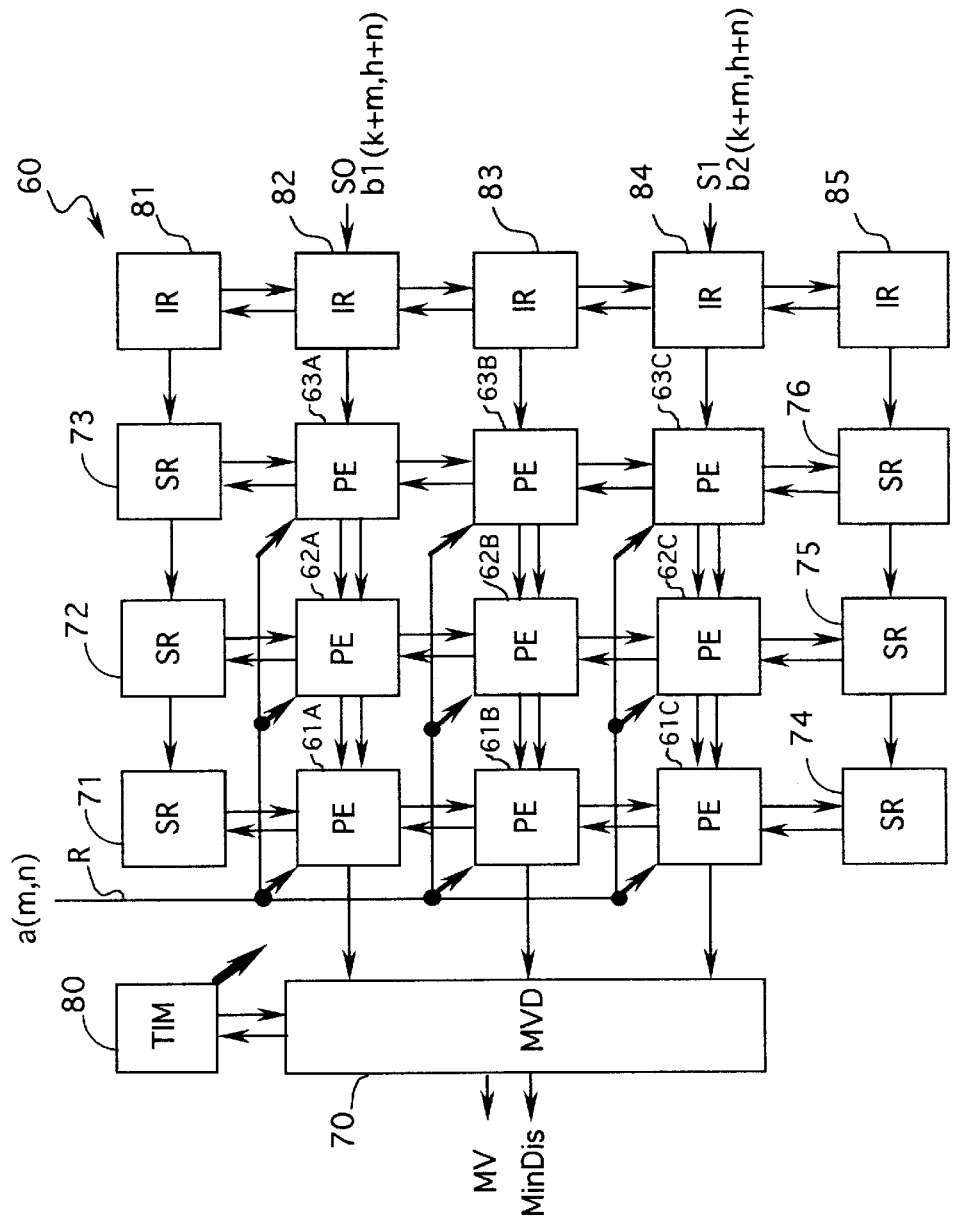
FIG. 28 schematically shows a prior-art motion vector searching apparatus having a circuit of the systolic array structure type.
Figure 29:
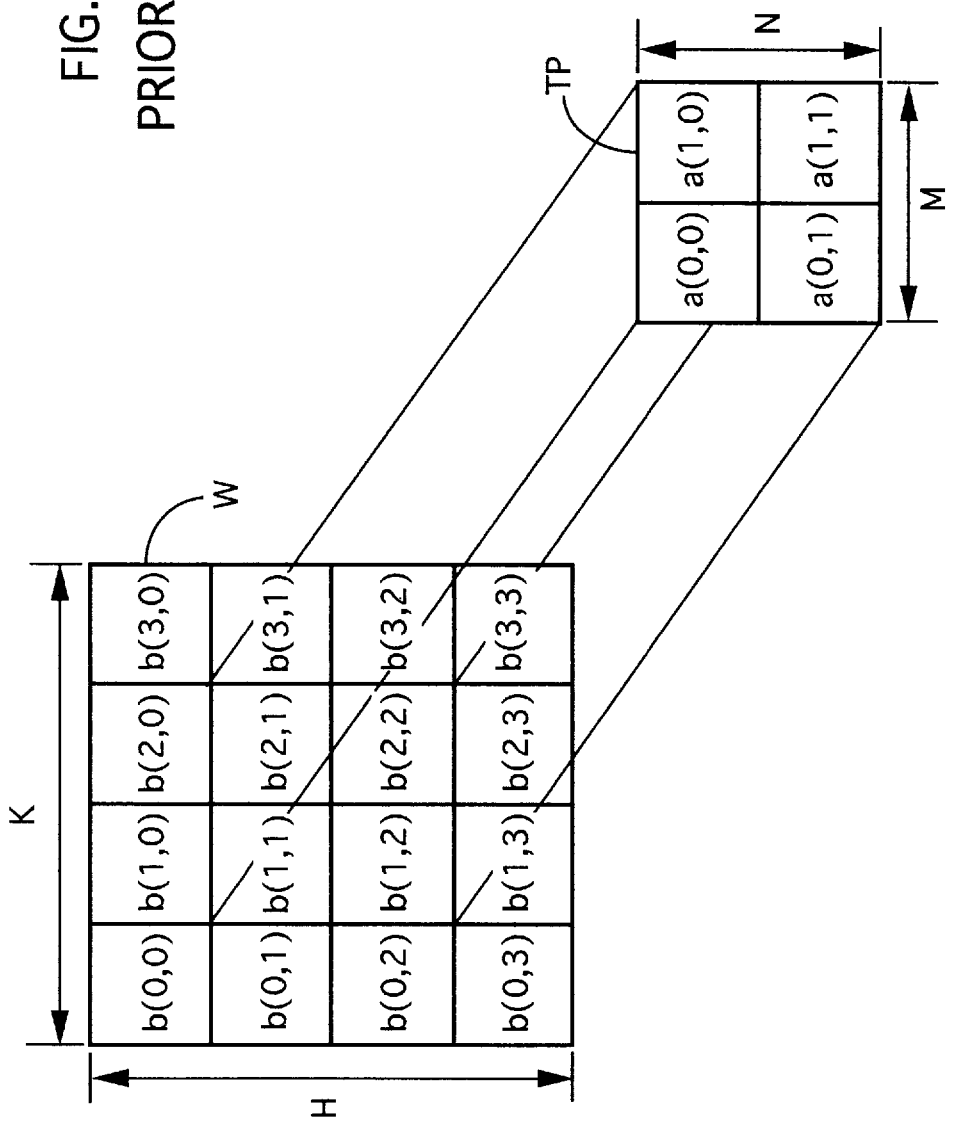
FIG. 29 is a diagram showing search window data and current block data supplied to the motion vector searching apparatus shown in FIG. 28.

As a substitute for the two row of side register units SR, a row of thirteen side registers SRm may be used as shown in FIG. 22. Each of the side register SRm is modified to be associated with the processor elements PE and the intermediate register units IP in the rows Ra and Rb. To put it concretely, each of the side registers SRm further have data input lines and data output lines each vertically extending as the above data input lines YUi, YDi and data output lines YDo, YUo.

It will be understood by those skilled in the art that the foregoing description is in terms of preferred embodiments of the present invention wherein various modifications are possible within the scope of the appended claims.

What is claimed is:

1. A motion vector searching apparatus for searching a plurality of motion vectors indicative of visual motion between a current picture and a reference picture forming part of successive pictures for displaying a dynamic picture image, said current picture being partially formed by a current picture block represented by a plurality of pixels distributed in rows and columns, said reference picture being partially formed by a search window including a set of reference picture blocks represented by a plurality of pixels distributed in rows and columns, and said reference picture blocks each having a block size the same as that of said current picture block, comprising:

current block data outputting means for outputting current block data including pixel values representative of the pixels of said current picture block;

search window data outputting means for outputting search window data including pixel values representative of the pixels of the search window which is expected to include one reference picture block most similar to said current picture block;

a set of processor elements each including a transmission register capable of receiving and registering said search window data, each of said processor elements being capable of computing a distortion value indicative of a distortion between said current picture block and one of the reference picture blocks of said search window on the basis of said current block data outputted from said current block data outputting means and said search window data received and registered by its own transmission register, and said search window being larger than a window consisting of a plurality of reference picture blocks which are equal in number to said processor elements and which are arranged under condition that any two adjoining reference picture blocks are horizontally, vertically or diagonally deviated by one-pixel pitch from each other;

a set of intermediate registers wedged into said set of processor elements and capable of receiving and registering said search window data, the total number of said processor elements and said intermediate registers being equal to that of the reference picture blocks included in said search window, and the reference picture blocks included in said one of said search windows being classified into two difference groups consisting of a first block group which is constituted by the reference picture blocks respectively corresponding to said processor elements, and a second block group which is constituted by the reference picture blocks respectively corresponding to said intermediate registers;

transmission controlling means for controlling said transmission and intermediate registers to cause the pixel values of each of the reference picture blocks of said search window to pass through the corresponding transmission or intermediate register, and only the distortion values of the reference picture blocks of said first block group being computed by said processor elements; and minimum distortion detecting means for detecting the minimum value from said distortion values computed by said processor elements.

2. A motion vector searching apparatus as set forth in claim 1, in which said processor elements comprise calculators, respectively, the calculator of each processor element receiving the pixel values of said current picture block and the pixel values of the reference picture block of said search window registered by the transmission register of the same processor element to calculate and sum up local distortion values each representative of a difference between one pixel value of said current picture block and one pixel value of the reference picture block corresponding in position to each other.

3. A motion vector searching apparatus as set forth in claim 2, in which each of said processor elements calculates the local distortions with time sharing process while the pixel values of each of said reference picture blocks pass through the transmission register of each processor element in order.

4. A motion vector searching apparatus as set forth in claim 3, in which said calculators of said processor elements comprise difference calculation circuits and summation calculation circuits, respectively, each of the difference calculation circuits having first and second input ports and an output port, the first input port of the difference calculation circuit of each processor element receiving the pixel values of the reference picture block from the transmission register of the same processor element, the second input port of the difference subtracting circuit of each processor element receiving the pixel values of said one of said current picture block from said current block data outputting means, and the output port of the difference calculation circuit of each processor element outputting, as the local distortion value, a difference between values received by said first and second input port, each of the summation calculation circuits having an input port and an output port, the input port of the summation calculation circuit of each calculator receiving the local distortion from the output port of the difference calculation circuit of each calculator, and the output port of the summation calculation circuit of each calculator output, as the distortion value, a sum of the local distortions based on all of the pixel values included in one reference picture block.

5. A motion vector searching apparatus as set forth in claim 2, in which the pixel values of said current picture block are provided to said calculators in parallel by said current block data outputting means simultaneously when each of said processor elements receives the pixel values of the corresponding reference picture block.

6. A motion vector searching apparatus as set forth in claim 1, further comprising a set of input registers each operative to input and transmit said search window data from said search window data outputting means to said transmission and intermediate registers, and a plurality of side registers which have the pixel values of said search window received from and returned to said transmission, intermediate and input registers when the pixel values of said search window are transmitted between said transmission, intermediate and input registers.

7. A motion vector searching apparatus as set forth in claim 6, which further comprises a plurality of transmission paths through which said pixel values of said search window data are transmitted, each of said transmission paths being constituted by said transmission, intermediate, side and input registers.

8. A motion vector searching apparatus as set forth in claim 6, in which said processor elements, said intermediate registers, said side registers and said input registers collectively form a systolic array structure type of circuit.

9. A motion vector searching apparatus as set forth in claim 1, in which the columns of the reference picture blocks of said search window are classified into first and second column groups, each column of said first column group consisting of the reference picture blocks corresponding to the transmission and intermediate registers, each column of said second column group consisting of the reference picture blocks corresponding to the intermediate registers, the columns of said first column group and the columns of said second column group being alternatively arranged, and each of the side end columns and the uppermost and lowermost rows including at least one reference picture block corresponding to the transmission register.

10. A motion vector searching apparatus as set forth in claim 1, in which the rows of the reference picture blocks of said search window are classified into first and second row groups, each row of said first row group consisting of the reference picture blocks corresponding to the transmission and intermediate registers, each row of said second row group consisting of the reference picture blocks corresponding to the intermediate registers, the rows of said first column group and the rows of said second column group being alternatively arranged, and each of the side end rows and the uppermost and lowermost rows including at least one reference picture block corresponding to the transmission register.

11. A motion vector searching apparatus as set forth in claim 1, in which the columns of the reference picture blocks of said search window are classified into first and second column groups, each column of said first column group consisting of the reference picture blocks corresponding to the transmission and intermediate registers and each column of said second column group consisting of the reference picture blocks corresponding to the intermediate registers and said first column group including at least two columns different from each other in the number of the reference picture blocks corresponding to the transmission register.

12. A motion vector searching apparatus as set forth in claim 1, in which the rows of the reference picture blocks of said search window are classified into first and second row groups, each row of said first row group consisting of the reference picture blocks corresponding to the transmission and intermediate registers, and each row of said second row group consisting of the reference picture blocks corresponding to the intermediate registers, and said first row group including at least two rows different from each other in the number of the reference picture blocks corresponding to the transmission register.

13. A motion vector searching apparatus as set forth in claim 1, in which the columns of the reference picture blocks of said search window are classified into first and second column groups, each column of said first column group consisting of reference picture blocks corresponding to the transmission and intermediate registers, and each column of said second column group consisting of the reference picture blocks corresponding to the intermediate registers, and the number of columns of said second column group between two adjacent columns of said first column group being constant.

14. A motion vector searching apparatus as set forth in claim 1, in which the rows of the reference picture blocks of said search window are classified into first and second row groups, each row of said first row group consisting of reference picture blocks corresponding to the transmission and intermediate registers, each row of said second row group consisting of the reference picture blocks corresponding to the intermediate registers, and the number of rows of said second row group between two adjacent rows of said first row group being constant.

15. A motion vector searching apparatus as set forth in claim 1, in which, as a distance from the center point of said search window to a position becomes smaller, the density of the referenced picture blocks corresponding to said processor elements located in the neighborhood of said position becomes larger.

16. A motion vector searching apparatus for searching a plurality of motion vectors indicative of visual motion between a current picture and a reference picture forming part of successive pictures for displacing a dynamic picture image, said current picture consisting of a plurality of current picture blocks each having a plurality of pixels distributed in N rows and M columns, each of said N and M being an integer, said reference picture consisting of a plurality of search windows each having a window size of K columns of H pixels, said K and H being integers and equal to or larger than said M and N, respectively, each of said search windows including $(H-N+1) \times (K-M+1)$ reference picture blocks each represented by a plurality of pixels distributed in N row and M columns comprising:

current block data outputting means for outputting current block data including pixel values representative of the pixels forming one of said current picture blocks;

search window data outputting means for outputting search window data including pixel values representative of the pixels forming one of said search windows which is expected to include one of said reference pictures most similar to said one of said current picture;

a set of processor elements each including a transmission register capable of receiving and registering said search window data, each of said processor elements being capable of computing a distortion value indicative of a distortion between said one of said current picture blocks and one of the reference picture blocks of said reference picture on the basis of said current block data outputted from said current block data outputting means and said search window data received and registered by its own transmission register, and the number of said processor elements being smaller than $(H-N+1) \times (K-M+1)$;

a set of intermediate registers wedged into said set of processor elements and capable of receiving and registering said search window data, the total number of said transmission and intermediate registers being equal to $(H-N+1) \times (K-M+1)$. and said processor elements and said intermediate registers being arranged in the form of a matrix array and respectively corresponding in position to the reference picture blocks included in said search window;

transmission controlling means for controlling said transmission and intermediate registers to cause the pixel values of each of the reference picture blocks of said search window to pass through the corresponding transmission or intermediate registers, and only the distortion values of the reference picture blocks respectively corresponding in position to said transmission registers being computed by said processor elements; and minimum distortion detecting means for detecting the minimum value from said distortion values computed by said processor elements.

17. A motion vector searching apparatus as set forth in claim 16, in which said processor elements comprise calculators, respectively, the calculator of each processor element receiving the pixel values of said one of said current picture blocks and the pixel values of one reference picture block of said one of said search window registered by the transmission register of the same processor element to calculate and sum up local distortion values each representative of a difference between one pixel value of said one of said current picture blocks and the corresponding pixel value of the reference picture block.

18. A motion vector searching apparatus as set forth in claim 17, in which said processor elements calculate the local distortions with time sharing while the pixel values of one reference picture block pass through the corresponding transmission register.

19. A motion vector searching apparatus as set forth in claim 18, in which said calculators of said processor elements comprise difference calculating circuits and summation calculating circuits, respectively, each of the difference calculating circuits having first and second input ports and an output port, the first input port of the difference subtracting circuit of each processor element receiving the pixel values of the reference picture block from the transmission register of the same processor element, the second input port of the difference subtracting circuit of each processor element receiving the pixel values of said one of said current picture block from said current block data outputting means, and the output port of the difference subtracting circuit of each processor element outputting, as the local distortion value, a difference between values received by said first and second input port, each of the summation calculating circuits having an input port and an output port, the input port of the summation calculating circuit of each calculator receiving the local distortion from the output port of the difference calculating circuit of the same calculator, and the output port of the summation calculating circuit of each calculator outputting, as the distortion value, a sum of the local distortions based on all of the pixel values included in one reference picture block.

20. A motion vector searching apparatus as set forth in claim 16, which further comprises a column of (H−N+1) input registers each operative to input and transmit said search window data from said search window data outputting means to said transmission and intermediate registers, and (N−1) rows of (K−M+1) side registers each operative to input the pixel values of said reference picture blocks from one of said transmission and intermediate registers and to output the inputted pixel value to one of said transmission and intermediate registers, and in which said transmission controlling means controls said transmission registers, said intermediate registers, said input registers and said side registers to ship the pixel values of said search window data in the vertical direction of said search window and to ship the pixel values registered in said transmission and intermediate registers in the horizontal direction of said search window hen the pixel values of said search window data are inputted to said transmission and intermediate registers from said input registers.

21. A motion vector searching apparatus as set forth in claim 20, in which the number of said side registers is twice that of columns of the matrix array of transmission and intermediate registers, the half of said side registers being aligned along the uppermost row of the matrix array of said transmission and intermediate registers, the remaining half of said side registers being aligned along the lowermost row of the matrix array of said transmission and intermediate registers, and said transmission, intermediate and side registers forming a matrix array, the number of said input registers is that of rows of the matrix array of transmission, intermediate and side registers, and said input registers being aligned along one side end column of the matrix array of transmission, intermediate and side registers.

22. A motion vector searching apparatus as set forth in claim 21, in which said processor elements and said intermediate registers, said side registers and said input registers collectively form a systolic array structure type of circuit.

23. A motion vector searching apparatus as set forth in claim 16, in which the columns of the matrix array of said transmission and intermediate registers are classified into first and second column groups, each column of said first column group consisting of the transmission and intermediate registers, each column of said second column group consisting of the intermediate registers, the columns of said first column group and the columns of said second column group being alternatively arranged, and each of the side end columns and the uppermost and lowermost rows including at least one transmission register.

24. A motion vector searching apparatus as set forth in claim 16, in which the rows of the matrix array of said transmission and intermediate registers are classified into first and second row groups, each row of said first row group consisting of the transmission and intermediate registers, each row of said second row group consisting of the intermediate registers, the rows of said first row group and the rows of said second row group being alternatively arranged, and each of the side end columns and the uppermost and lowermost rows including at least one transmission register.

25. A motion vector searching apparatus as set forth in claim 16, in which the columns of the matrix array of said transmission and intermediate registers are classified into first and second column groups, each column of said first column group consisting of the transmission and intermediate resisters, and said first column group including at least two columns different in the number of transmission registers from each other.

26. A motion vector searching apparatus as set forth in claim 16, in which the rows of the matrix array of said transmission and intermediate registers are classified into first and second row groups, each row of said first row group consisting of the transmission and intermediate registers, each row of said second row group consisting of the intermediate registers, and said first row group including at least two rows difference in the number of transmission registers from each other.

27. A motion vector searching apparatus as set forth in claim 16, in which the pixel values of said current picture block are provided to said calculators in parallel by said current block data outputting means simultaneously when each of said processor elements receives the pixel values of the corresponding reference picture block.

28. A motion vector searching apparatus as set forth in claim 16, in which the columns of the matrix array of said transmission and intermediate registers are classified into first and second column groups, each column of said first column group consisting of the transmission and intermediate registers, each column of said second column group consisting of the intermediate registers, and the number of columns of said second column group between two adjacent columns of said first column group being constant.

29. A motion vector searching apparatus as set forth in claim 16, in which the rows of the matrix array of said transmission and intermediate registers are classified into first and second row groups, each row of said first row group consisting of the transmission and intermediate registers, each row of said second row group consisting of the intermediate registers, and the number of rows of said second row group between two adjacent rows of said first row group being constant.

30. A motion vector searching apparatus as set forth in claim 16, in which, as a distance from the center point of each of said search windows to a position becomes smaller, the density of the processor elements located in the neighborhood of said position becomes larger.

31. A motion vector searching method of searching a plurality of motion vectors indicative of visual motion between a current picture and a reference picture forming part of successive pictures for displaying a dynamic picture image, said current picture being partially formed by a current picture block having a plurality of pixels distributed in rows and columns, and said reference picture being partially formed by a search window including a set of reference picture blocks represented by a plurality of pixels distributed in rows and columns, and said reference picture blocks each having a block size the same as that of said current picture block, comprising the steps of:

(a) preparing a plurality of a plurality of processor elements each including a transmission register capable of receiving and registering said search window data and a plurality of intermediate registers wedged into said processor elements and capable of receiving and registering said search window data, each of said processor elements being capable of computing a distortion value indicative of a distortion between said current picture block and one of the reference picture blocks of said search window on the basis of said current block data outputted from said current block data outputting means and said search window data received and registered by its own transmission register, said search window being larger than a window consisting of a plurality of reference picture blocks which are equal in number to said processor elements and which are arranged under condition that any two adjoining reference picture blocks are horizontally, vertically or diagonally deviated by one-pixel pitch from each other, the total number of said processor elements and said intermediate registers being equal to that of the reference picture blocks included in said search window, and the reference picture blocks included in said one of said search window being classified into two difference groups consisting of a first block group which is constituted by the reference picture blocks respectively corresponding to said processor elements, and a second block group which is constituted by the reference picture blocks respectively corresponding to said intermediate registers;

(b) feeding current block data to said processor elements, said current block data including pixel values representative of the pixels of said current picture block;

(c) feeding search window data to said transmission registers of said processor elements and said intermediate registers, said search window data including pixel values representative of the pixels of the search window which is expected to include one reference picture block most similar to said current picture block;

(d) controlling said transmission and intermediate registers to cause the pixel values of each of the reference picture blocks of said search window to pass through the corresponding transmission or intermediate register; and (e) controlling said processor elements to compute only the distortion values of the reference picture blocks of said first block group; and (f) detecting the minimum value from the computed distortion values to select from said reference picture blocks one most similar to one of said current picture blocks.

32. A motion vector searching method as set forth in claim 31 in which said step (e) comprises steps of:

(e1) feeding the pixel values of said current picture block and the pixel values of the reference picture block of said search window registered by the transmission register of the same processor element;

(e2) calculating local distortion values each representative of a difference between one pixel value of said current picture block and ne pixel value of the reference picture block corresponding in position to each other; and (e3) summing up said cola distortion value to obtain only the distortion values of the reference picture blocks of said first block group.

33. A motion vector searching method as set forth in claim 32, which further comprises the step of controlling said processor elements to calculate the local distortions with time sharing process while the pixel values of each of said reference picture blocks pass through the transmission register of each processor element in order.

34. A motion vector searching method as set forth in claim 31, which further comprises the steps of:

preparing a plurality of side registers having part of the pixel values of said search window received from and returned to said transmission and intermediate registers when the pixel values of said search window are transmitted between said transmission and intermediate registers, and a plurality of input registers through which the pixel values of said search window are fed to said transmission, intermediate and side registers, and controlling said transmission, intermediate, side and input registers to cause each of processor elements to receive the pixel values of the corresponding reference picture block under the same condition.

* * * * *